(12) United States Patent
Van Cleve et al.

(10) Patent No.: US 6,520,028 B1
(45) Date of Patent: Feb. 18, 2003

(54) GYROSCOPIC MASS FLOWMETER

(75) Inventors: Craig Brainerd Van Cleve, Lyons, CO (US); Roger Scott Loving, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/724,230

(22) Filed: Nov. 28, 2000

(51) Int. Cl.[7] .................................................. G01F 1/84
(52) U.S. Cl. .................................................. 73/861.354
(58) Field of Search ..................... 73/861.354, 861.355, 73/861.356; 702/56, 33

(56) References Cited

U.S. PATENT DOCUMENTS

| | | | | |
|---|---|---|---|---|
| 2,865,201 A | * | 12/1958 | Roth | 73/194 |
| 4,729,243 A | * | 3/1988 | Friedland et al. | 73/861.38 |
| 5,476,013 A | * | 12/1995 | Hussain et al. | 73/861.37 |
| 5,557,973 A | | 9/1996 | Koudal et al. | |
| 5,814,739 A | * | 9/1998 | VanCleve | 73/861.357 |
| 5,892,159 A | * | 4/1999 | Smith | 73/861.354 |
| 5,969,265 A | | 10/1999 | Van Cleve et al. | |
| 5,987,999 A | * | 11/1999 | VanCleve et al. | 73/861.357 |
| 6,230,104 B1 | * | 5/2001 | Shelley et al. | 702/56 |
| 6,314,820 B1 | * | 11/2001 | Ollila | 73/861.357 |

FOREIGN PATENT DOCUMENTS

| | | |
|---|---|---|
| EP | 0 579 493 A2 | 1/1994 |
| EP | 0 763 720 A1 | 3/1997 |
| EP | 0 905 488 A2 | 3/1999 |

* cited by examiner

Primary Examiner—Benjamin R. Fuller
Assistant Examiner—Jewel V. Thompson
(74) Attorney, Agent, or Firm—Faegre & Benson LLP

(57) ABSTRACT

Apparatus for and a method of operating a mass flowmeter having a first embodiment that uses gyroscopic forces to determine material flow information for a material flow. The interior of the flow tube defines a helix element that imparts a rotation to the material flow within the flow tube. Driver induced transverse flow tube vibrations and the rotation imparted to the material flow together generate cyclic gyroscopic forces within the flow tube. The magnitude of the flow tube deflection from the gyroscopic forces is related to the magnitude of the material flow and is measured to determine material flow information. A second embodiment of the flowmeter detect the Coriolis forces on the vibrating flow tube and generates material flow information from the detected Coriolis forces. The Coriolis based flow information and the gyroscopic based flow information are both applied to meter electronics which uses the two sets of Information for comparison and error checking and other purposes.

31 Claims, 9 Drawing Sheets

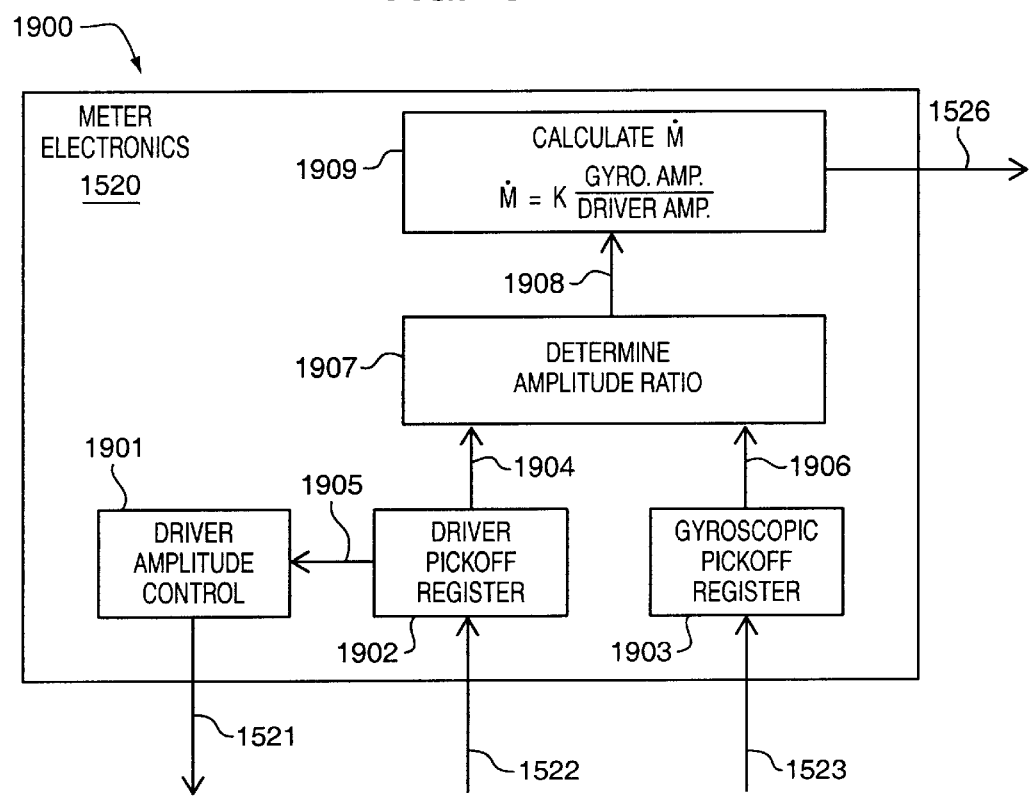
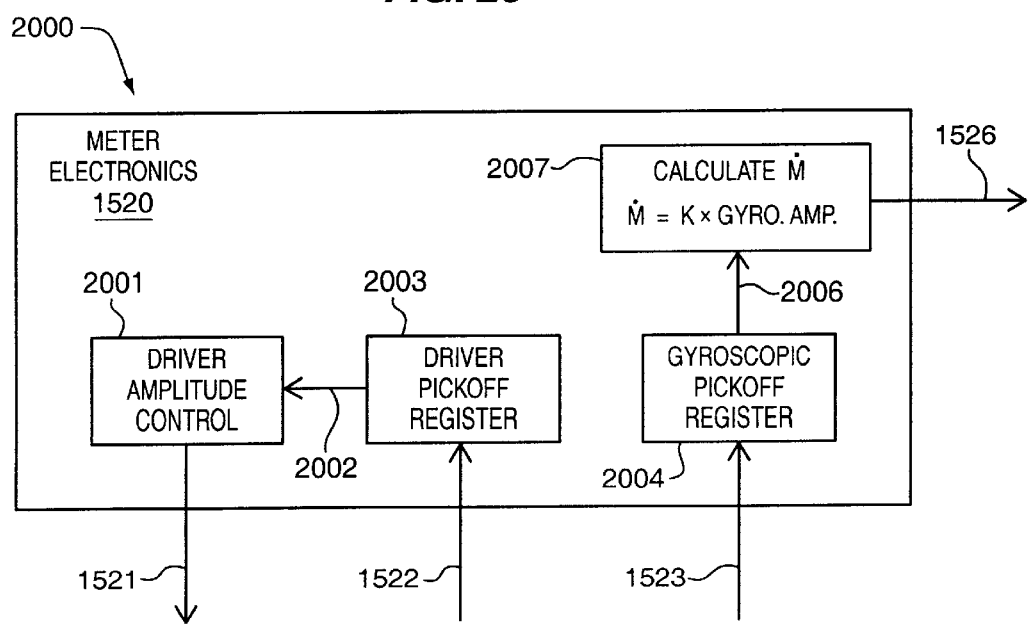

GYROSCOPIC MASS FLOWMETER

FIELD OF THE INVENTION

This Invention relates to a flowmeter and, in particular, to a flowmeter that imparts a rotation to a material flow within a vibrating flow tube and measures generated gyroscopic forces to determine information regarding the material flow.

Problem

Mass flowmeters measure the mass flow rate rather than the volumetric flow rate of material. They are desirable because mass measurement is often needed for chemical reactions, recipes, custody transfer, and many other applications. Furthermore, the accuracy of mass flowmeters is not impaired by changing material density, temperature, or viscosity. Coriolis effect mass flowmeters have been on the market for at least twenty years. They are well liked because of their accuracy and their ability to measure density as well as mass. However, the high cost of Coriolis flowmeters has limited their acceptance in the market.

In prior art single straight tube Coriolis mass flowmeters, the flow tube is connected at both ends to a parallel balance bar. The flow tube is vibrated out of phase in a drive plane with respect to the balance bar at a resonant frequency. An electromagnetic driver maintains the desired amplitude of the vibration. The flow tube and balance bar act as counterbalances to each other to create a dynamically balanced structure. Velocity sensors are located at two locations along the flow tube to measure the relative velocities between the flow tube and balance bar. The velocity sensors are usually located equal distances upstream and downstream from the flow tube's midpoint.

The vibrating flow tube imposes rotations on the upstream and downstream halves of the flow tube. The rotations stop and change direction along with the flow tube's vibration direction. The fixed ends of the flow tube are the pivot points for the rotation and the flow tube's longitudinal center is the point of maximum amplitude. The material moving through the rotating segments of the flow tube creates a Coriolis force that deforms the flow tube and produces a phase delay between the signals output by the velocity sensors. The phase delay between the velocity sensor output signals is proportional to the mass flow rate of the material.

The prior art single straight flow tube Coriolis mass flowmeters have a short straight flow tube that is very stiff in bending. The high stiffness results in high frequencies for the higher modes of flow tube vibration. The driven mode of vibration is usually the mode with the lowest frequency, the first bending mode. In this mode, both the flow tube and the balance bar vibrate out of phase with each other in the drive plane. The shape of this vibration mode is the same as the shape of a vibrating guitar string. The maximum vibration amplitude is in the center and the nodes (fixed points) are on the ends. The driver keeps the flow tube and balance bar vibrating and is located at the center of the flow tube and balance bar.

With straight flow tube geometry, the Coriolis force bends the flow tube in the shape of the second bending mode. The second bending mode is shaped like a stretched S and has three nodes. Two nodes are on the flow tube ends and the third node is in the center. When a flow tube vibrates in the second bending mode, the two halves of the flow tube (located on either side of the central driver) appear to be vibrating out of phase with each other. The second bending mode has a resonant frequency that is almost three times that of the first bending mode. It has a high resonant frequency because the flow tube is very stiff and it is very difficult to bend the flow tube in the shape of the second bending mode.

Coriolis forces are applied to the flow tube at the drive frequency (the resonant frequency of the first bending mode). Assuming the flow tube is horizontal and is vibrated in a vertical drive plane in the first bending mode, the Coriolis deformation of the flow tube is also in the drive plane and has the shape of the second bending mode. If material is flowing from left to right and the flow tube center is passing through the zero displacement point while traveling downward, the Coriolis force on the left half of the flow tube is in the upward direction while the Coriolis force on the right half of the flow tube is in the downward direction. When the flow tube is passing through zero displacement while traveling upward, the direction of the Coriolis force is reversed. The Coriolis force is applied to the flow tube in a sinusoidal manner (with respect to time) at the drive frequency. The Coriolis force is at its peak when the flow tube velocity is at its peak and the Coriolis force is zero when the flow tube velocity is zero as it changes direction.

The Coriolis force deflects the flow tube in the second bending mode shape but at the first mode (drive) frequency. The drive frequency is so far below the resonant frequency of the second bending mode that the maximum deflection of the flow tube due to the Coriolis force is very low. The Coriolis deflection is comparable in amplitude to the static deflection that would result from a static application of the Coriolis force. The Coriolis force due to material flow thus has to deform the stiff flow tube in a very stiff mode shape (the second bending) at a frequency (first bending) that is far removed from the second bending resonant frequency. The result is an extremely small Coriolis deflection of the flow tube and a very small phase difference between the signals produced by the two velocity sensors. A typical time delay (phase difference divided by frequency) between the two signals resulting from a maximum flow rate through a typical meter is ten microseconds. If the meter is to have no more than 0.15% error at ten percent of maximum flow, then the time delay measurement accuracy has to be better than 1.5 nanoseconds ($1.5 \times 10^{-9}$ seconds). Accurately measuring such small time increments requires extremely sophisticated and expensive electronics.

Solution

The present invention overcomes the problems of prior Coriolis mass flowmeters by using gyroscopic force rather than Coriolis force in the material flow measurement. In accordance with one possible exemplary embodiment of the invention, a single straight tube gyroscopic flowmeter is provided that looks like the Coriolis flowmeter described above except that its flow tube has an internal helical baffle which causes the material to rotate about the longitudinal axis of the flow tube as the material flows through the tube. The rotating material causes the flow tube to act as a gyroscope. The gyroscopic meter is also different from Coriolis flowmeters in that it has its velocity sensors at the longitudinal center of the flow tube rather than upstream and downstream from the center as do Coriolis flowmeters.

In order to understand how the gyroscopic force of the rotating material can be used to measure flow, the nature of gyroscopic behavior and force will first be examined in two examples. The first example illustrates the motion (precession) that results from a torque applied to a gyroscope axle when the axle is unconstrained. The second example allows the calculation of the torque that the gyroscope axle applies to its mounting when the gyroscopic motion (precession) of the first example is prevented by constraints. It is this resultant torque that deforms the flow tube of the present invention and enables measurement of the mass flow rate.

Gyroscopes are devices having mass that rotates about an axis (called the spin axis) giving them angular momentum. Typical gyroscopes have a circular disk-like mass that is mounted on a thin axle. Conservation of the angular momentum of the rotating disc gives gyroscopes their unique properties. In understanding the present invention it is only necessary to understand how gyroscopes behave, not why they behave the way they do. Therefore, the following is limited to a description of gyroscopic behavior as pertains to the gyroscopic flowmeter of the present invention.

Consider a typical toy gyroscope having a flywheel rotating on an axle that is thirty degrees from vertical. In the first mounting condition to be considered, example 1, the top end of the gyroscope axle is free to move in all direction while the bottom of the axle is fixed at a point so that it cannot translate but it can freely rotate or pivot in all directions. If the flywheel were not rotating the gyroscope would immediately fall over due to the overturning torque of its weight times the horizontal offset of it's center of mass from the axle bottom point. But, the rotation of the flywheel gives-the gyroscope angular momentum which resists the overturning torque. Instead, the overturning torque causes the top end of the axle to circle the vertical axis. The rate of this circular motion, called precession, increases as the top end of the gyroscope axle slowly spirals down. In summary, the overturning torque produces an angular acceleration of the top end of the axle in a circumferential direction about the vertical axis. This increasing rate of precession is the familiar increasing wobble of a toy top axis as it rotates down.

In the second mounting condition, example 2, the axle of the rotating gyroscope is initially on the Y-axis of a coordinate system (vertical) and the bottom end of the axle is again constrained in translation so that it can rotate in all directions but cannot translate. The motion of the top end of the axle is confined to the X-Y plane so that it cannot move in the Z-direction. This constraint of the top end of the axle can be visualized as a slot that is aligned with the X-axis in which the top of the axle can freely move. Applying force to the top end of the axle in the X-direction (along the slot) results in the movement of the axle upper end in the slot and the rotation of the axle in the X-Y plane about the axle bottom end (not about its rotating axis). This rotation of the axle in the X-Y plane would result in precession of the axle except that the slot prevents it. Instead, the axle top end applies a gyroscopic force, $G_F$, to the side of the slot in the negative Z-direction. The gyroscopic force can be calculated since it is a function of the angular momentum of the gyroscope and the angular velocity at which the axle is rotated in the X-Y plane. For the present invention, it is important to note that the angular velocity of the axle in the X-Y plane causes a force $G_F$ to the axle at a right angle to the X-Y plane and also at a right angle to the gyroscope axis.

The material rotating in the flow tube of the present invention causes it to behave like a pair of gyroscopes. One flowmeter-gyroscope extends from the tube inlet to the tube midpoint while the other flowmeter-gyroscope from the tube midpoint to the tube outlet. The gyroscopic spin axes correspond to the flow tube axis and the flywheels correspond to the rotating material in each half of the flow tube. The force applied to the flow tube by the driver corresponds to the force applied to the top end of the axle in the slot of example 2. The tube vibration in the drive plane causes the flow tube center line, or spin axis, to rotate in the drive plane alternately in each direction corresponding to the slot direction. The fixed ends of the flow tube are the pivot points of the two flowmeter-gyroscope spin axes. The flow tube midpoint can be considered to be the free (or slot) end of each. The slot restraining the gyroscope axle end in example 2, however, does not exist in the flowmeter. Nor are the flowmeter-gyroscopes' ends (tube center) free as in example 1. Instead, the flow tube stiffness resists motion of the tube center out of the drive plane but does not prevent it. The behavior of the flowmeter-gyroscopes falls between that of example 1 and that of example 2. The gyroscopic force causes a deflection of the tube center out of the drive plane that is proportional to the gyroscopic force $G_F$. The gyroscopic force $G_F$ is in turn proportional to the mass flow rate. Thus the deflection of the flow tube out of the drive plane can be used to determine the mass flow rate of the flowing material.

The direction of the gyroscopic force $G_F$ and the deflection of the flow tube in response to the force $G_F$ is perpendicular to both the drive direction and the flow tube axis. The deflection in the gyroscopic direction reverses sign with the direction reversal of the drive vibration. The maximum tube deflection in the gyroscopic direction occurs when the tube deflection in the drive direction is passing through zero and the velocity in the drive direction is at its maximum. The flow tube deflection out of the drive plane is of the sign that conserves angular momentum. If the material rotation in the flow tube, when viewed from an end, is clockwise, then the combined drive and gyroscopic vibrations gives both flow tube halves a clockwise elliptical motion. The rate of rotation of the mass in the flow tube (proportional to the flow rate) determines the magnitude of the tube deflection in the gyroscopic direction. The flow rate determines how narrow (low flow) or wide (high flow) is the resulting ellipse. When the drive and gyroscopic forces are equal, the flow tube takes a circular path when viewed from the end.

The gyroscopic force $G_F$ and the flow tube deflection in the gyroscopic direction are proportional to the angular momentum of the rotating material flow. The angular momentum is proportional to the mass times the velocity of the mass about the spin axis. Because the product of mass and velocity determine the gyroscopic force and thus the gyroscopic deflection, the deflection is proportional to mass flow rate rather than volumetric flow rate. If the material density is low, then for a given mass flow rate, the material velocity has to be high. Conversely, for a high density material at the same mass flow rate, the material velocity has to be low. The product of density and velocity is independent of density for a given mass flow rate. Thus, the material density is irrelevant to the accurate measurement of the mass flow rate.

The gyroscopic force $G_F$ differs from the Coriolis force in three significant ways. First, as has been discussed, the gyroscopic force is lo the drive plane whereas the Coriolis force is in the drive plane. Secondly, the gyroscopic force is in the same direction for the full length of the flow tune (this will be discussed later whereas the Coriolis force changes sign in the center of thee flow tube. The uniformity of the sign of the gyroscopic force along the flow tube means that the flow tube deformation for the gyroscopic meter is of the first bending mode shape while the deformation for the Coriolis meter is of the second bending mode shape. The flow tube is much easier to bend in the first bending mode than in the second and thus for a given force, the flow tube deflects further in a gyroscopic flowmeter. Thirdly, the gyroscopic deflection is driven at or near the resonant frequency for its mode shape (the first bending mode) while the Coriolis deflection is driven at a frequency far removed from its mode shape resonant frequency (the second bending mode). Therefore, the gyroscopic deflection receives great amplification due to being driven at or near its resonant frequency while the Coriolis deflection receives very little. These three differences make the gyroscopic deflection larger than the Coriolis deflection and allow for the use of less expensive signal processing.

The magnitude of the gyroscopic force is proportional to the mass flow rate, the number of revolutions made by the helical baffle, and the vibration amplitude in the drive plane. The maximum flow rate for the flowmeter can be set so that the gyroscopic force at the maximum flow rate is approximately equal to the force that the driver applies to the flow tube. Thus the flow tube is driven in a circle at the maximum flow rate by the drive and the gyroscopic force. At lesser flow rates, the gyroscopic force is less and the circle is flattened. In order to determine the flow rate, a velocity sensor senses the velocity in the gyroscopic direction and another senses the velocity in the drive direction. The ratio of the peak velocities (peak gyroscopic/peak drive) would be the fraction of the maximum flow rate that is flowing. This velocity ratio method is easily done and avoids both the difficulty and the cost of measuring time in nanoseconds.

In accordance with other possible exemplary embodiments of the invention, a helix internal to the flow tube is not used. Instead, the flow tube is wound in the shape of a helix around a stiff rod so that the helix and the rod have a common longitudinal axis. This imparts rotation to the material flow about the longitudinal axis. Both the flow tube and rod are vibrated by a driver in a drive plane to generate gyroscopic deflections in a perpendicular plane. Alternatively, a pair or flow tubes are twisted together to form a pair of helical members with a common helical (longitudinal) axis. This imparts a rotation to the material flow in both flow tubes about the common axis. The twisted. pair is then vibrated by a driver and the material flow generates gyroscopic forces as above described. Alternatively, a single flow tube is wound to form a helix to generate a rotation to the material flow about the helical axis of the flow tube. The flow tube is the vibrated with a driver to generate gyroscopic deflections due to the rotation of the material flow.

In accordance with yet another possible exemplary embodiment, velocity sensors are positioned upstream and downstream of the flow tube center to detect the Coriolis deflections of the flow tube. The output signal from these sensors is used along with the signals of the gyroscopic sensors to provide a flowmeter that generates both gyroscopic signals and Coriolis signals for the determination of material flow output information.

An aspect of the invention is a flowmeter having a material inlet, a material outlet, and flow tube apparatus connected between said inlet and said outlet, said flowmeter being adapted to receive a material flow at said inlet and to extend said material flow through said flow tube apparatus to said outlet; said flowmeter further comprising:

a driver that cyclically deforms said flow tube apparatus by vibrating said flow tube apparatus at a drive frequency in a drive plane that includes. said longitudinal axis of said flow tube apparatus;

apparatus that imparts a rotation to said material flow in said flow tube apparatus about said longitudinal axis of said vibrating flow tube apparatus;

said apparatus for imparting includes said flow tube apparatus;

said flow tube apparatus is responsive to the cyclic deformation of said flow tube apparatus by said driver and to said rotation of said material flow that generates cyclic gyroscopic mode deformation of said flow tube apparatus in a gyroscopic plane; said cyclic gyroscopic mode deformation has an amplitude related to the magnitude of said material flow;

pickoff apparatus responsive to said gyroscopic mode cyclic deformation that generates gyroscopic signals indicative of the magnitude of said material flow; and meter electronics responsive to the generation of said gyroscopic signals that generates output information pertaining to said material flow.

Preferably said pickoff apparatus includes a first pickoff that generates signals representing the amplitude of said cyclic gyroscopic mode deformation;

said flowmeter further includes conductor apparatus that extends said signals from said pickoff apparatus to said meter electronics;

said meter electronics is responsive to the receipt of said signals generated by said first pickoff that generates said information pertaining to said material flow.

Preferably said pickoff apparatus further includes:

a second pickoff that generates a signal representing the amplitude of said cyclic flow tube deformation in said drive plane; and characterized in that said meter electronics includes:

apparatus responsive to the receipt of said signals generated by said first and second pickoffs that determines the ratio of the amplitude of said cyclic flow tube gyroscopic mode deformation in said gyroscopic plane to the amplitude of said cyclic flow tube deformation in said drive plane; and apparatus responsive to said determination of said ratio that generates said output information pertaining to said material flow.

Preferably said output information includes the mass flow rate of said material is flow.

Preferably said flowmeter further includes a pickoff that measures the amplitude of said cyclic gyroscopic mode deformation of said flow tube in said gyroscopic plane; said meter electronics comprises:

apparatus that controls the amplitude of said cyclic flow tube deformation in said drive plane; and apparatus responsive to said measurement of the amplitude of said cyclic gyroscopic mode deformation of said flow tube in said gyroscopic plane that determines the mass flow rate of said material flow.

Preferably said drive frequency is equal to the resonant frequency of said cyclic gyroscopic mode deformation amplitude to maximize said cyclic gyroscopic mode deformation in said gyroscopic plane.

Preferably said drive frequency is not equal to the resonant frequency of the gyroscopic mode deformation to alter the relationship between the material flow density and the amplitude of said cyclic gyroscopic mode deformation in said gyroscopic plane.

Preferably said flow tube apparatus comprises:

a single straight flow tube:

a helix internal to said flow tube, said helix imparts said rotation to said material flow about said longitudinal axis of said flow tube to generate said cyclic gyroscopic mode deformation in said gyroscopic plane.

Preferably said flow tube apparatus comprises:

a single flow tube having a helix shape that imparts said rotation to said material flow about said longitudinal axis of said flow tube.

Preferably said flow tube apparatus comprises:

a plurality of flow tubes twisted together about a common longitudinal axis to have an elongated shape that imparts said rotation to said material flow about said common longitudinal axis.

Preferably said flow tube apparatus comprises:

a bar and a flow tube wound on said bar to form a coil that imparts said rotation to said material flow about the common longitudinal axis of said flow tube and said Preferably said elongated bar is substantially straight.

Preferably said bar and said flow tube are twisted together about said common longitudinal axis.

Preferably said material flow generates Coriolis forces in said drive plane on said vibrating flow tube apparatus, said Coriolis forces produce Coriolis deflections of said flow tube apparatus in said drive plane;

characterized in that said flowmeter further comprises:

pickoff apparatus on said flow tube apparatus that detect said Coriolis deflections and generate Coriolis signals containing information pertaining to said material flow;

said meter electronics is responsive to the generation of said Coriolis signals and said gyroscopic signals that generates output information pertaining to said material flow.

Preferably said flowmeter further comprises:

a balance bar parallel to said flow tube apparatus;

connecting ring apparatus connecting ends of said balance bar to said flow tube apparatus;

said driver cyclically deforms said flow tube apparatus and said balance bar in phase opposition in said drive plane at the resonant frequency of said material filled flow tube apparatus and said balance bar;

said cyclic gyroscopic mode deformation vibrates said material filled flow tube apparatus and said balance bar in said gyroscopic plane at the resonant frequency of the cyclic gyroscopic mode deformation.

Preferably said flowmeter further comprises:

a case enclosing said balance bar and said flow tube apparatus;

case ends connected to ends of said case;

ends of said flow tube apparatus project through said case ends of said case and are connected to flanges;

a first one of said flanges receives said material flow from a material source and extends said material flow through said flowmeter;

a second one of said flanges on an output end of said flow tube apparatus receives said material flow from said flow tube apparatus and extends said material flow to a destination.

Preferably said connecting ring apparatus comprises:

first and second connecting rings connecting each end of said balance bar to said flow tube apparatus; and lateral axial projections on said connecting rings in said drive plane and affixed to lateral side walls of said flow tube apparatus that alters the resonant frequency separation of said flow tube apparatus and said balance bar deformation in said drive plane and said cyclic gyroscopic mode deformation of said flow tube apparatus and said balance bar in said gyroscopic plane.

Preferably a balance bar further including openings in the walls of said balance bar that alter the separation of the resonant frequencies of said cyclic deformation in said drive plane and said cyclic gyroscopic mode deformation of said flow tube apparatus and said balance bar in said gyroscopic plane.

Preferably said method comprises the steps of:

cyclically deforming said flow tube apparatus by vibrating said flow tube apparatus in said drive plane;

imparting said rotation to said material flow about said longitudinal axis of said flow tube apparatus in response to said material flow, said rotation causes said cyclic gyroscopic mode deformation of said flow tube apparatus in said gyroscopic plane;

generating signals indicative of the magnitude of said material flow in response to said generation of said cyclic gyroscopic mode deformation; and operating said meter electronics in response to said generation of said signals that generates output information pertaining to said material flow.

Preferably said step of said generating output signals includes the step of generating signals representing the amplitude of said cyclic gyroscopic mode deformation in said gyroscopic plane.

Preferably the steps of:

determining the amplitude of said flow tube apparatus cyclic deformation in said drive plane;

determining the ratio of the amplitude of said flow tube apparatus cyclic gyroscopic mode deformation in said gyroscopic plane to the amplitude of said flow tube apparatus cyclic deformation in said drive plane; and in response to said determination of said ratio, generating said output information pertaining to said material flow.

Preferably the steps of:

controlling the amplitude of said flow tube apparatus cyclic deformation in said drive plane;

measuring the amplitude of said cyclic gyroscopic mode deformation of said flow tube apparatus in said gyroscopic plane; and operating said meter electronics in response to said measurement that generates said output information pertaining to said material flow.

Preferably operating said flowmeter so that said resonant frequency of said cyclic flow tube apparatus deformation in said drive plane is equal to the gyroscopic mode deformation resonant frequency to maximize the amplitude of said cyclic gyroscopic mode deformation in said gyroscopic plane.

Preferably operating said flowmeter so that said resonant frequency of said cyclic flow tube apparatus deformation in said drive plane is not equal to the gyroscopic mode deformation resonant frequency to alter the relationship between the density of said material flow and the amplitude of said cyclic gyroscopic mode deformation in said gyroscopic plane.

Preferably said flow tube apparatus comprises a single straight flow tube:

said method includes the step of inserting a helix internal to said flow tube to impart said rotation to said material flow about the longitudinal axis of said flow tube.

Preferably said flow tube apparatus comprises a single flow tube and wherein said method further includes the step of operating said flowmeter with said flow tube formed to define a coil spring shape that imparts said rotation to said material flow about the longitudinal axis of said flow tube.

Preferably said flow tube apparatus comprises a plurality of flow tubes and wherein said method further includes the steps of;

twisting said plurality of flow tubes together about a common longitudinal axis to define an elongated shape that imparts said rotation to said material flow.

Preferably said flow tube apparatus comprises a single flow tube and wherein. said method further includes the step of winding said flow tube on an elongated bars to form a coil that imparts said rotation to said material flow about a longitudinal axis common to said flow tube and said bar.

Preferably said material flow generates Coriolis forces in said drive plane on said vibrating flow tube apparatus, said Coriolis forces produce periodic Coriolis deflections of said flow tube apparatus in said drive plane; characterized in that said method further comprises;

operating pickoffs on said flow tube apparatus that detect said Coriolis deflections and generate output signals pertaining to said material flow;

operating said meter electronics in response to the generation of said Coriolis signals and said gyroscopic signals that generates output information pertaining to said material flow.

Preferably said flowmeter comprises a balance bar parallel to said flow tube apparatus;

connecting ring apparatus connecting ends of said balance bar to said flow tube apparatus;

said method further includes:

operating said driver to vibrate said flow tube apparatus and said balance bar in phase opposition in said drive plane at the resonant frequency of said material filled flow tube apparatus and said balance bar;

operating said flowmeter so that said gyroscopic forces vibrate said material filled flow tube apparatus and said balance bar in said gyroscopic plane at the resonant frequency of said material filled flow tube apparatus and said balance bar in said gyroscopic mode of vibration.

Preferably said gyroscopic plane is perpendicular to said drive plane and to said longitudinal axis of said flow tube.

Another aspect is that said pickoff means includes a first pickoff that generates signals representing the amplitude of said gyroscopic mode vibrations;

said flowmeter further includes conductor means that extends said signals from said pickoff means to said meter electronics;

said meter electronics is responsive to the receipt of said signals generated by said first pickoff for generating said information pertaining to said material flow.

Another aspect is that said pickoff means further includes:

a second pickoff for generating a signal representing the amplitude of said flow tube drive vibrations in said drive plane; and characterized in that said meter electronics includes:

means responsive to the receipt of said signals generated by said first and second pickoffs for determining the ratio of the amplitude of said flow tube gyroscopic mode vibrations in said gyroscopic plane to the amplitude of said flow tube drive mode vibrations in said drive plane; and means responsive to said determination of said ratio for generating said output information pertaining to said material flow.

Another aspect is that said output information includes the mass flow rate of said material flow.

Another aspect is that said flowmeter further includes a pickoff for measuring the amplitude of said gyroscopic mode vibrations of said flow tube in said gyroscopic plane; said meter electronics comprises:

means for controlling the amplitude of said flow tube drive mode vibrations in said drive plane; and means responsive to said measurement of the amplitude of said gyroscopic mode vibrations of said flow tube in said gyroscopic plane for determining the mass flow rate of said material flow.

Another aspect is that said drive frequency is equal to the resonant frequency of said gyroscopic vibration mode to maximize said gyroscopic mode vibrations in said gyroscopic plane.

Another aspect is that said drive frequency is not equal to the resonant frequency of the gyroscopic vibration mode to alter the relationship between the material flow density and the amplitude of said gyroscopic mode vibrations in said gyroscopic plane.

Another aspect is that said flow tube means comprises:

a single straight flow tube:

a helix internal to said flow tube, said helix imparts said spin to said material flow about said longitudinal axis of said flow tube to generate said gyroscopic mode vibrations in said gyroscopic plane.

Another aspect is that said flow tube means comprises:

a single flow tube having a coil spring shape that imparts said spin to said material flow about said longitudinal axis of said flow tube.

Another aspect is that said flow tube means comprises:

a plurality of flow tubes twisted together about a common longitudinal axis to have an elongated shape that imparts said spin to said material flow about said common longitudinal axis.

Another aspect is that said flow tube means comprises:

a bar and a flow tube wound on said bar to form a coil that imparts said spin to said material flow about the common longitudinal axis of said flow tube and said bar.

Another aspect is that said elongated bar is substantially straight.

Another aspect is that said bar and said flow tube are twisted together about said common longitudinal axis.

Another aspect is that said material flow generates Coriolis forces in said drive plane on said vibrating flow tube means, said Coriolis forces produce Coriolis deflections of said flow tube means in said drive plane; characterized in that said flowmeter further comprises;

pickoff means on said flow tube means that detect said Coriolis deflections and generate Coriolis output signals containing information pertaining to said material flow;

said meter electronics is responsive to the generation of said Coriolis signals and said gyroscopic signals for generating output information pertaining to said material flow.

Another aspect is that said flowmeter further comprises:

a balance bar parallel to said flow tube means;

connecting ring means connecting ends of said balance bar to said flow tube means;

said driver vibrates said flow tube means and said balance bar in phase opposition in a drive vibration mode in said drive plane at the resonant frequency of said material filled flow tube means and said balance bar;

said gyroscopic mode vibrations vibrate said material filled flow tube means and said balance bar in said gyroscopic plane at the resonant frequency of the gyroscopic mode vibrations of said material filled flow tube means and said balance bar.

Another aspect is that said flowmeter further comprises:

a case enclosing said balance bar and said flow tube means;

case ends connected to ends of said case;

ends of said flow tube means project through said case ends of said case and are connected to flanges;

a first one of said flanges receives said material flow from a material source and extends said material flow through said flowmeter;

a second one of said flanges on an output end of said flow tube means receives said material flow from said flow tube means and extends said material flow to a destination.

Another aspect is that said connecting ring means comprises:

first and second connecting rings connecting each end of said balance bar to said flow tube means; and lateral axial projections on said connecting rings and affixed to lateral side walls of said flow tube means for altering the resonant frequency separation of said drive mode vibration and said gyroscopic mode vibrations of said flow tube means and said balance bar.

Another aspect includes openings in the walls of said balance bar that alter the separation of the resonant frequencies of said drive mode vibrations and said gyroscopic mode vibrations of said flow tube means and said balance bar.

Another aspect includes a method of operating said flowmeter comprising the steps of:

vibrating said flow tube means in said drive plane;

imparting said spin to said material flow about said longitudinal axis of said flow tube means;

said spin causes said gyroscopic mode vibrations of said flow tube means in said gyroscopic plane;

generating output signals indicative of the magnitude of said material flow in response to said generation of said gyroscopic mode vibrations; and operating said meter electronics for generating output information pertaining to said material flow.

Another aspect is that said step of said generating output signals includes the step of generating signals representing the amplitude of said gyroscopic mode vibrations in said gyroscopic plane.

Another aspect includes the steps of:

determining the amplitude of said flow tube means drive mode vibrations in said drive plane;

determining the ratio of the amplitude of said gyroscopic mode vibrations in said gyroscopic plane to the amplitude of said flow tube means drive mode vibrations in said drive plane; and in response to said determination of said ratio, generating said output information pertaining to said material flow.

Another aspect includes the steps of:

controlling the amplitude of said flow tube means drive mode vibrations in said drive plane;

measuring the amplitude of said gyroscopic mode vibrations of said flow tube means in said gyroscopic plane; and operating said meter electronics in response to said measurement for generating said output information pertaining to said material flow.

Another aspect includes the step of operating said flowmeter so that said drive plane vibration mode resonant frequency is equal to the gyroscopic vibration mode resonant frequency to maximize the amplitude of said gyroscopic mode vibrations in said gyroscopic plane.

Another aspect includes the step of operating said flowmeter so that said drive vibration mode resonant frequency is not equal to the gyroscopic mode resonant frequency of said mode vibrations to alter the relationship between the density of said material flow and the amplitude of said gyroscopic mode vibrations in said gyroscopic plane.

Another aspect is that said flow tube means comprises a single straight flow tube:

said method includes the step of inserting a helix internal to said flow tube to impart said spin to said material flow about the longitudinal axis of said flow tube.

Another aspect is that said flow tube means comprises a single flow tube and wherein said method further includes the step of operating said flowmeter with said flow tube formed to define a coil spring shape that imparts said spin to said material flow about the longitudinal axis of said flow tube.

Another aspect is that said flow tube means comprises a plurality of flow tubes and wherein said method further includes the steps of:

twisting said plurality of flow tubes together about a common longitudinal axis to define an elongated shape that imparts said spin to said material flow.

Another aspect is that said flow tube means comprises a single flow tube and wherein said method further includes the step of winding said flow tube on an elongated bar to form a coil that imparts said spin to said material flow about a longitudinal axis common to said flow tube and said bar.

Another aspect is that said material flow generates Coriolis forces in said drive plane on said vibrating flow tube means, said Coriolis forces produce periodic Coriolis deflections of said flow tube means in said drive plane; characterized in that said method further comprises:

operating pickoffs on said flow tube means that detect said Coriolis deflections and generate output signals pertaining to said material flow;

operating said meter electronics in response to the generation of said Coriolis signals and said gyroscopic signals for generating output information pertaining to said material flow.

Another aspect is that said flowmeter comprises a balance bar parallel to said flow tube means;

connecting ring means connecting ends of said balance bar to said flow tube means;

said method further includes:

operating said driver to vibrate said flow tube means and said balance bar in phase opposition in said drive plane at the resonant frequency of said material filled flow tube means and said balance bar;

operating said flowmeter so that said gyroscopic forces vibrate said material filled flow tube means and said balance bar in said gyroscopic plane at the resonant frequency of said material filled flow tube means and said balance bar in said gyroscopic mode of vibration.

DESCRIPTION OF THE DRAWINGS

The above and other advantages of the features of the invention may be better understood from a reading of the following detailed description thereof taken in conjunction with the following drawings in which;

FIGS. 10 and 11 are end views of the flow tube of FIG. 9 showing the motion of the flow tube with flow and without flow.

DETAILED DESCRIPTION

Figure 1:
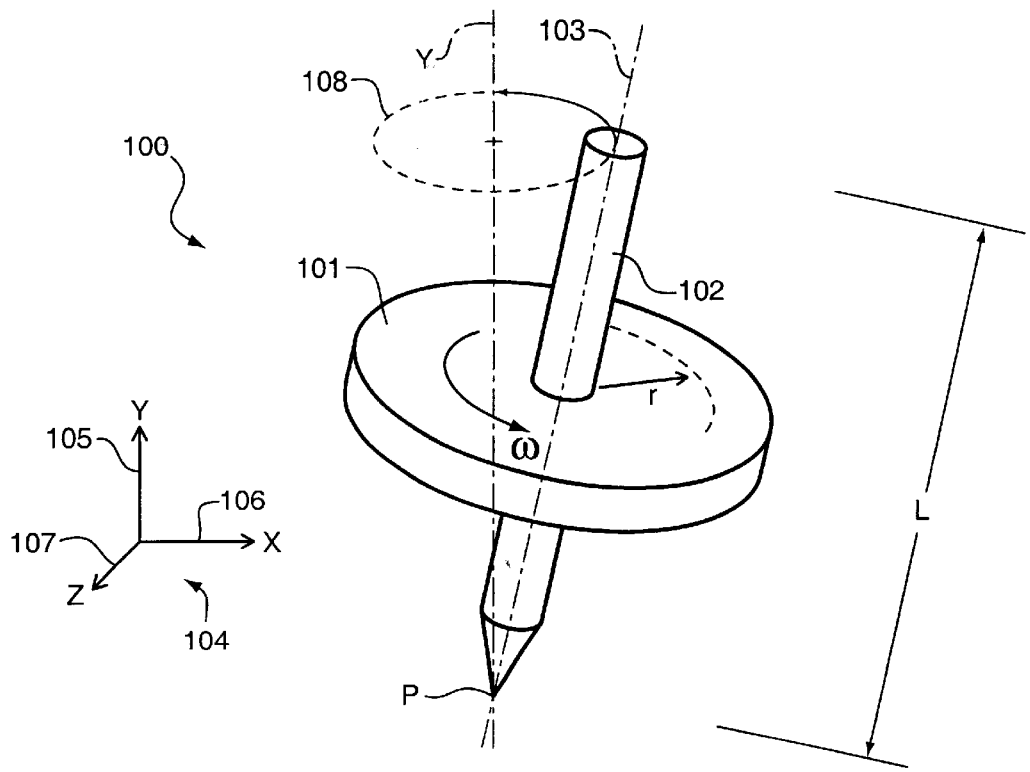
FIG. 1 is a diagram of a gyroscope having a precessing spin axis.
Figure 2:
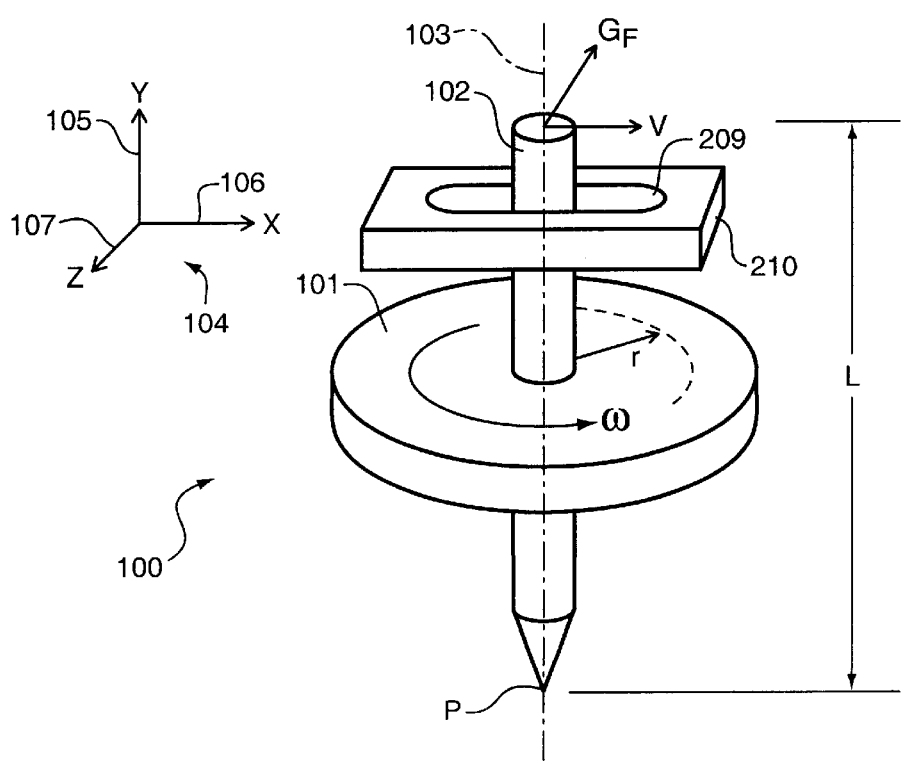
FIG. 2 is a diagram of a gyroscope having precession prevented.

FIGS. 1 and 2

In order to better understand the means by which the present invention measures flow, it is necessary to understand the Gyroscopic force and how it is applied to a vibrating flow tube. FIG. 1 shows gyroscope 100 having flywheel 101 and an axle 102 of length L. The flywheel and axle are rotating with an angular rotation velocity ω about a spin axis 103 that is coincident with the centerline of the axle 102. Axle 102 has a length L that is oriented at an angle to the Y-axis 105 (vertical direction) of coordinate system 104. Flywheel 101 has a radius of gyration r that is the radius at which the mass of the gyroscope could be concentrated to give the same rotary inertia as the extended mass of flywheel 101 and axle 102. The bottom end of the gyroscope is fixed at point P so that is free to rotate in all directions but it cannot translate in any direction. The gyroscope of FIG. 1 is acted upon by gravity (force not shown) which applies a torque to overturn the gyroscope. The overturning torque causes the gyroscope axis to circle the Y-axis as shown by the path 108. This circling of the Y-axis is known as precession.

Gyroscope 200 of FIG. 2 is shown with a vertical axle. The top end of the axle 102 protrudes through a slot 209 in block 210. The block is fixed in space so that it cannot move. The slot extends in the X-direction and constrains the top end of the axle 102 to motion in only in the X-direction. The bottom end of the axle is fixed, as is the axle in FIG. 1, so that it can rotate but not translate.

The top end of the axle 102 in FIG. 2 has a force applied to it (not shown) in the X-direction giving it a velocity V. Since the axle bottom is fixed at P, the result is an angular velocity V/L of the axle in the plane X-Y plane. The angular velocity of the gyroscope axis would cause the axle to precess as in FIG. 1 except that slot 209 prevents precession. Instead, axle 102 applies a gyroscopic force, $G_F$, to the side of the slot in the negative Z-direction. It will be noted again that the gyroscopic force $G_F$ is perpendicular to the spin axis 103 and the velocity direction of the top of the axle 102.

The equation for the torque $G_L$ is found in any good textbook on the dynamics of machinery, including *Kent's Mechanical Engineer's Handbook*, twelfth edition, page 7–18. The torque is given as equation 1.

$$GL = mr^2 \left(\frac{\pi N}{30}\right)\left(\frac{V}{L}\right) \quad \text{EQUATION 1}$$

Where:
GL=torque on the axle
m=mass of the flywheel
r=radius of gyration
N=RPM of the flywheel
V=velocity of the top of the axle
L=length of the axle The above examples of gyroscopic behavior and the gyroscopic force equations are given to better facilitate understanding of the gyroscopic force as it is applied to a vibrating flow tube containing rotating material. However, there are significant differences between the gyroscopes and the flowmeter of the present invention and these will be discussed as they arise.

FIG. 3

Figure 3:
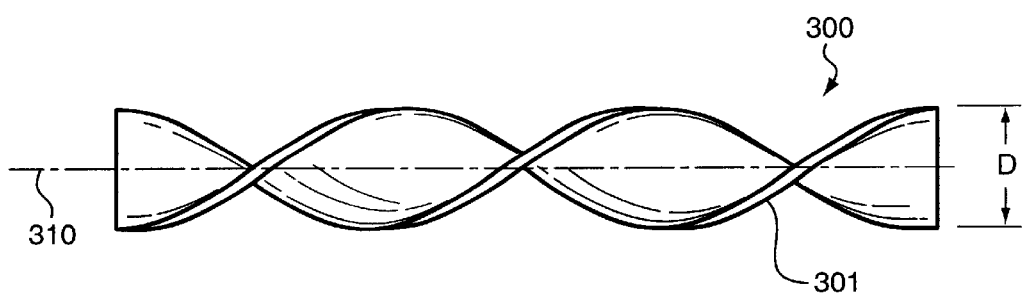
FIG. 3 discloses a helical baffle.

In order for the material flow in a flow tube to display gyroscopic properties, it must be given rotation. FIG. 3 shows one possible preferred embodiment of a device 300 that is inserted into the flow tube to rotate the material as it flows. Device 300 is a metal ribbon 301 that is twisted and inserted and brazed to the inside of a flow tube. Ribbon 301 assures that the material flow undergoes a known number of rotations about the longitudinal axis 310 as it traverses the flow tube. As the material flow rate increases, the material flow velocity and the material rotation increase and generates increased gyroscopic properties.

FIG. 4

Figure 4:
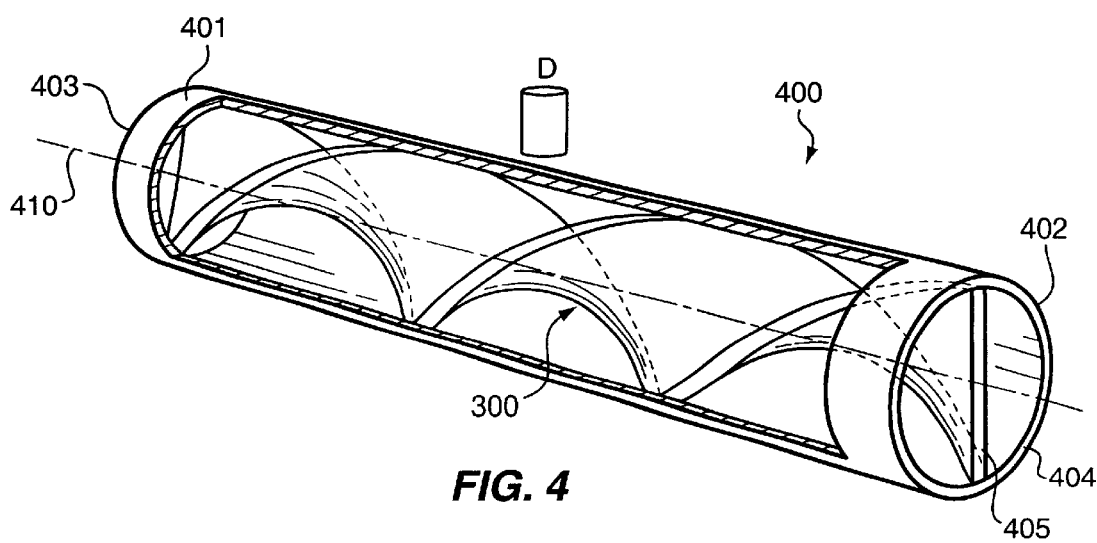
FIG. 4 discloses a helical baffle internal to a flow tube.

FIG. 4 shows ribbon 301 of FIG. 3 after it is brazed into flow tube 401. This geometry could also be achieved by extruding a suitable material directly into the desired shape to form a combined flow tube and helix. The extrusion process is ideal for a plastic gyroscopic meter. Driver D vibrates flow tube 401 in the drive plane while the helical ribbon 405 assures that the material flow undergoes a known number of revolutions about the longitudinal axis 410 as the material flow traverses the flow tube length.

FIGS. 5–8

Figure 5:
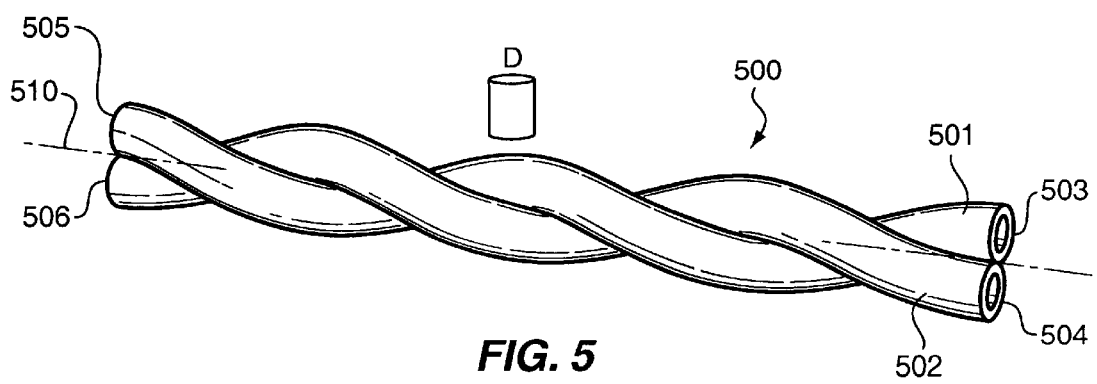
FIG. 5 discloses a twisted pair of flow tubes.

FIG. 5 shows alternative flow tube apparatus 500 that assures that the material flow undergoes a known number of rotations about the longitudinal axis 510 as it traverses the flow tube length. Apparatus 500 is formed by twisting and brazing together multiple flow tubes 501 and 502 of smaller diameter into a composite flow tube 500. Flow tube 500 has the advantage of simple and inexpensive tooling, but it has the disadvantage of high pressure drop for the material as it traverses the meter. The high pressure drop is due to the smaller tube diameter required by multiple tubes. Driver D vibrates apparatus 500 in the drive plane.

Figure 6:
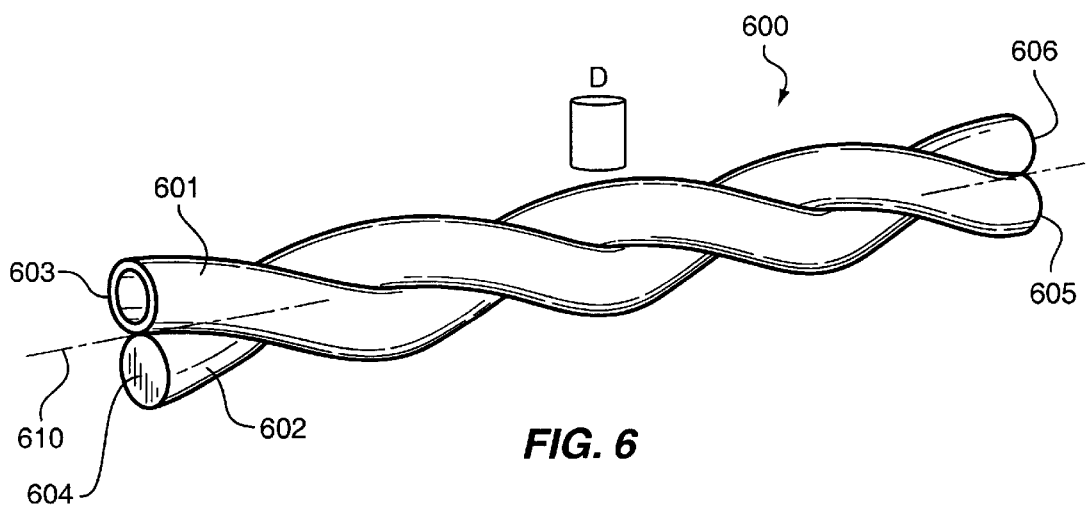
FIG. 6 shows a flow tube and a solid rod twisted together.

FIG. 6 shows alternative flow tube apparatus 600 that assures that the material flow undergoes a known number of rotations about longitudinal axis 610 as it traverses the flowmeter. Apparatus 600 comprises a hollow flow tube 601 and a solid elongated rod 602 twisted together. Apparatus 600 has the advantage that the flow tube may have a sufficiently large diameter to provide the desired material flow capacity while being intertwined with rod 602 which provides sufficient rigidity to flow tube 601 of apparatus 600. Driver D vibrates apparatus 600 in the drive plane vertically in the plane of the paper.

Figure 7:
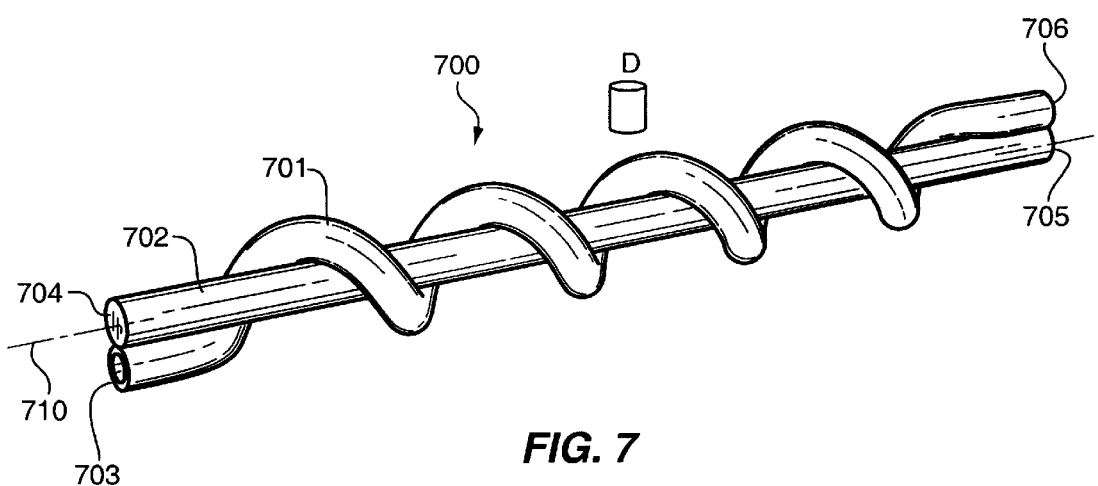
FIG. 7 shows a flow tube twisted around a straight rod.

FIG. 7 provides alternative flow tube apparatus 700 that assures that the material flow undergoes an known number of rotations about longitudinal axis 710 as the material traverses the flowmeter. Apparatus 700 shows a coiled flow tube 701 wound around a straight rod 702 which imparts rigidity to flow tube 701. A flow tube 701 may be made of sufficient diameter to provide the required material flow capacity. Left ends of the flow tube and rod are designated as elements 706 and 705 while the right end is designated as elements 703 and 704. Driver D vibrates the apparatus 700 vertically.

Figure 8:
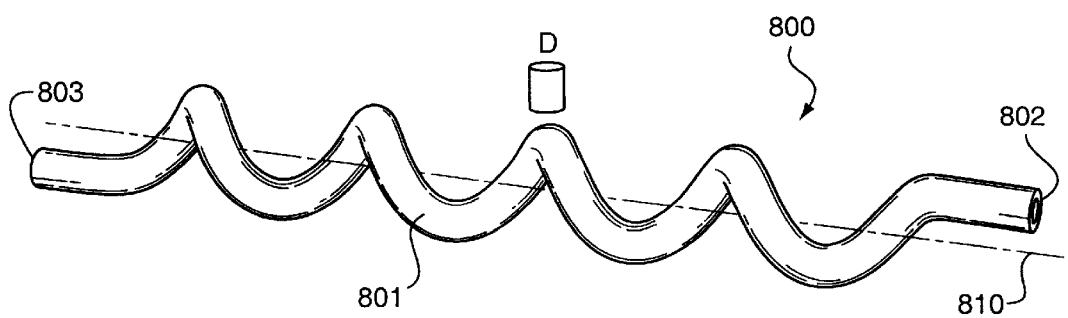
FIG. 8 shows a flow tube having a coil shape.

FIG. 8 provides alternative flow tube apparatus 800 which assures that the material flow undergoes a known number of rotations about the longitudinal axis 810 as it traverses the flowmeter of which the disclosed apparatus 800 is a part. Apparatus 800 is vibrated vertically by driver D. Apparatus 800 comprises a coiled flow tube 801 having a left end 803 and a right end 802.

FIGS. 9–11

Figure 9:
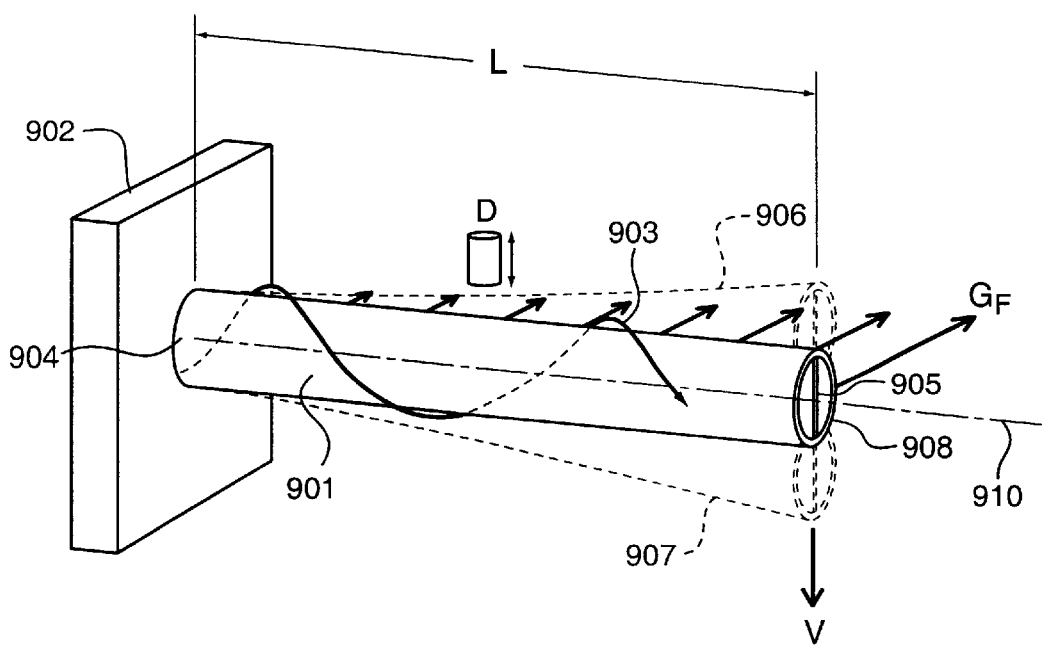
FIGS. 9, 10 and 11 disclose a vibrating cantilever flow tube with a rotating material flow.

FIG. 9 shows the gyroscopic force on a vibrating cantilevered flow tube 901 containing rotating material. This geometry could be used as a flowmeter, but it is primarily used herein as an aid to understanding and to bridge the gap between the gyroscope of FIG. 2 and the flowmeter of the present invention which has both ends of it's flow tube fixed. Flow tube 901 is oriented on the X-axis and its free end 908 is vibrated at resonance in the vertical, or Y-direction by a driver D. Fixed end 904 is connected to a stationary block 90?. Flow tube 901 contains a helical baffle 905 (similar to 301) that causes the material flow to rotate with a motion shown by path 903 about longitudinal axis 910. Flow tube 901 is shown as it passes through zero displacement in the downward direction by the solid lines. It has a velocity V in the downward (–Y) direction. The dashed lines 906 and 907 show flow tube 901 at its maximum displacement in the positive and negative Y-directions. The flow tube vibration in the Y direction gives the flow tube (and spin axis) an alternating rotation in the X-Y (drive) plane about its fixed end 904. The vibration imparted rotation of the material spin axis is comparable to the angular velocity V/L of the gyroscope spin axis in FIG. 2. Force $G_F$ is the gyroscopic force that the rotating material applies to cantilevered flow tube 901 as the flow tube bends downward. The force $G_F$ is perpendicular to both the velocity V and the tube axis. At the upper and lower extent of its travel, the flow tube stops and reverses direction. This causes the flow tube axis rotation in the X-Y plane about its fixed end 904 to reverse direction. The gyroscopic force $G_F$ also has its direction reversed when the flow tube axis rotation in the X-Y plane reverses. The force $G_F$ can thus be seen as a sinusoidal force that is in phase with the flow tube velocity V but has its direction perpendicular to both the flow tube velocity V and the flow tube axis.

The cantilever tube of FIG. 9 differs from the gyroscope of FIG. 2 in several ways. The entire axle of the gyroscope of FIG. 2 rotates the same amount in FIG. 2 while the rotation of the flow tube axis in the drive plane varies along its length. The cantilever tube rotation increases from zero at fixed end 904 to a maximum at free end 908. The gyroscopic force of FIG. 9 for the vibrating flow tube is also distributed axially along the flow tube, with zero force at the fixed end and the maximum force at the free end. The equation for gyroscopic torque, Equation 1, solves for the torque imparted to a rigid axle whose entire axis rotates the same amount. Thus Equation 1 does not directly apply to a bending flow tube.

The equation for the gyroscopic torque on a bending flow tube is easily determined with calculus. The flow tube is divided into small pieces with vanishingly small length and mass. Each small piece can be treated as a straight piece of tube because the curvature is so slight. However, the curvature of the entire deformed tube is needed to determine the amount each flow tube segment rotates. Fortunately, the deformed shape of the vibrating flow tube is nearly the same as the deformed shape of a uniformly loaded cantilever beam. For a uniformly loaded beam, the deformation (deflection from horizontal) is proportional to the cube of the distance from the fixed end. For sinusoidal vibration, the velocity is proportional to the displacement. Thus, the velocity distribution along the tube is proportional to the cube of the distance from the fixed end. This means that the peak vibration velocity of each flow tube segment, which is used in Equation 1, is also proportional to the cube of the distance from the fixed tube end, and also that the gyroscopic force $G_F$ on each segment is proportional to the cube of the distance from the fixed end. The distribution of the gyroscopic force $G_F$ along the vibrating tube is shown by the arrows, $G_F$. The net gyroscopic torque $G_{FL}$ is determined by integrating for the torque along the length of the flow tube. The resulting equation for the peak gyroscopic torque is given by Equation 2.

$$G_F L = 1/3\, mr^2 \left(\frac{\pi N}{30}\right)\left(\frac{V_{max}}{L}\right) \qquad \text{EQUATION 2}$$

Where:

$V_{max}$=peak velocity of the flow tube end. Equation 2 shows that the peak torque on the vibrating cantilever flow tube is simply one third of the torque on the rotating gyroscope of equation 1. The difference in value is due to the bending of the flow tube versus the uniform rotation of the gyroscope axle. The torque from Equation 2 is important because it bends the flow tube out of the drive plane (the X-Y plane) and provides for the measurement of the material flow.

The equation for the gyroscopic force $G_F$ applied to the flow tube over time is simply the peak torque times the cosine of the vibration frequency times time.

$$G_{FL} = 1/3\, mr^2 \left(\frac{\pi N}{30}\right)\left(\frac{V_{max}}{L}\right)\cos(wt) \qquad \text{EQUATION 3}$$

Figure 10:
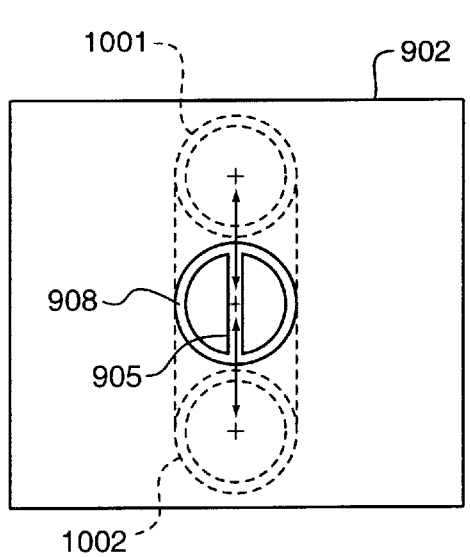
Figure 11:
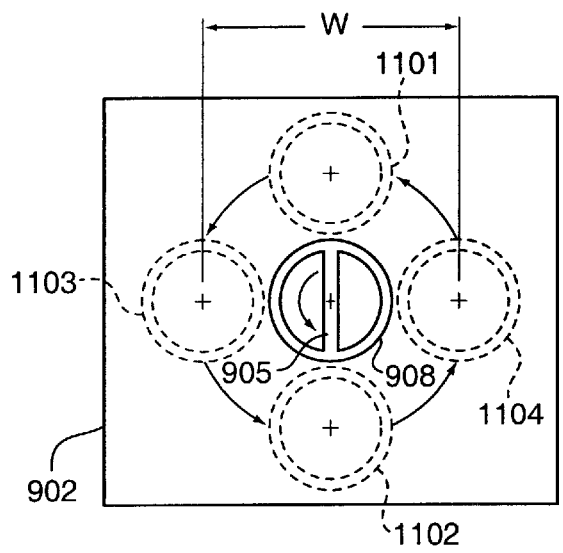

FIGS. 10 and 11 disclose end views of the vibrating cantilever flow tube 901 of FIG. 9. FIG. 10 is an end view of vibrating flow tube 901 with no material flow and thus no material rotation. The solid circle of end 908 represents the flow tube with zero displacement. The dashed lines represent the maximum displacement in the positive and negative directions. The flow tube vibration remains planar in the drive plane with no material flow. FIG. 11 is an end view of the vibrating flow tube 901 with material flow. The gyroscopic effect forces the flow tube 901 vibration out of the vertical plane and into an elliptical motion. The top and bottom dashed circles 1101 and 1102 represent the maximum displacement in the positive and negative drive direction. The left and right dashed circles 1103 and 1104 represent the maximum displacement of the flow tube in the positive and negative gyroscopic directions. The center solid circle represents the position of the tube at rest and the arrow inside A shows the direction of the material rotation. The width of the ellipse, W, formed by circles 1103–1104 is proportional to the gyroscopic torque on flow tube 901. Width W is also proportional to the mass of the material flow times the rotation rate of the material (see Equations 1–3.) and thus to the mass flow rate of the material. The ellipse becomes a circle when the net gyroscopic torque is equal to the torque the driver applies to the flow tube. It should be noted that the drive displacement and the gyroscopic displacement are perpendicular to each other and that when one is at its maximum, the other is at zero. The sum of the two planar vibrations results in the elliptical motion shown in FIG. 11.

The cantilever flow tube 901 of FIG. 9, FIG. 10, and FIG. 11 is vibrated by a sinusoidal force from a driver D. The frequency of the sinusoidal force is set to be equal to the flow tube's first bending mode resonant frequency for reasons of energy efficiency. At resonance, very little drive force is required to maintain a large vibration amplitude. The resonant frequency of the flow tube in bending is the same in both the drive and the gyroscopic directions because of the symmetry of the flow tube. The sinusoidal gyroscopic force, like the drive force, is applied to the flow tube by the flowing material at the resonant (drive) frequency. Because the gyroscopic force is applied to the flow tube at the resonant frequency of the flow tube in the gyroscopic direction, the result is a large amplitude of flow tube deformation in the gyroscopic direction.

Figure 12:
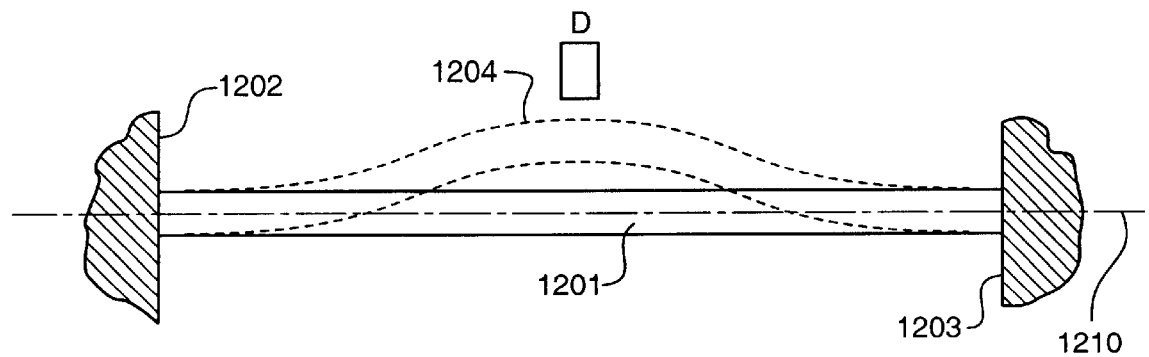
FIG. 12 shows a conceptual vibrating flow tube.
Figure 13:
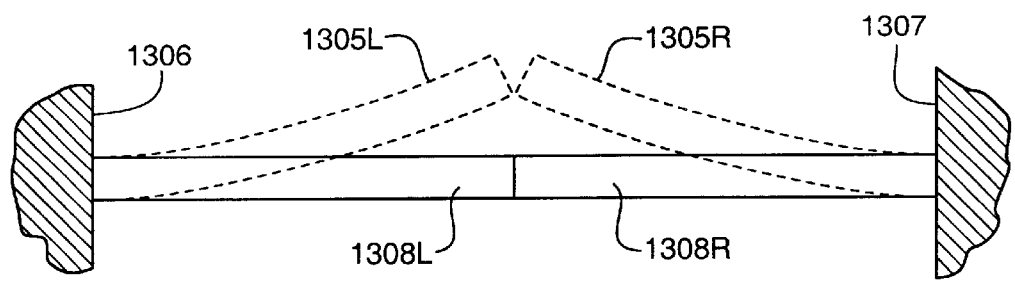
FIG. 13 shows a pair of vibrating cantilever tubes.

One preferred embodiment of the gyroscopic flowmeter has the flow tube fixed at both ends. FIGS. 12 and 13 are used to illustrate the difference between the gyroscopic force distribution on a cantilevered flow tube and on a flow tube fixed at both ends. In FIG. 12, flow tube 1201 is fixed at both ends 1202 and 1203. Flow tube 1201, like cantilever flow tube 901, contains a helical baffle (not shown) which causes the material flow to rotate. The flow tube 1201 is shown at its maximum deflection in the drive direction by the dotted lines 1204. FIG. 13 shows a pair of cantilever tubes 1308L and 1308R that are each similar to the cantilever tube 901 of FIGS. 9–11. Cantilever tubes 1308L and 1308R are also shown at their maximum deflection in the drive direction by dotted lines 1205L and 1205R.

A comparison of the shapes of the deflected tubes of FIGS. 12 and 13 reveals a significant difference. The slope of the axes of the cantilever tubes 1305L and 1395R continually increases toward the free (central) ends of both tubes. The slope of the axis of the continuous tube 1201, however, initially increases but then decreases to zero at the center of the tube. This difference in the deformed mode shape results in a difference in the amount of tube center line rotation in the drive plane during drive vibration. The continuous flow tube has a central segment that does not rotate with vibration in the drive plane but merely translates up and down. The lack of rotation of the central segment in the drive plane means that no gyroscopic force is generated by the flowing and rotating material in the central segment. In contrast, the cantilever tubes have their maximum slope and thus their greatest rotation and gyroscopic force at their free ends.

Figure 14:
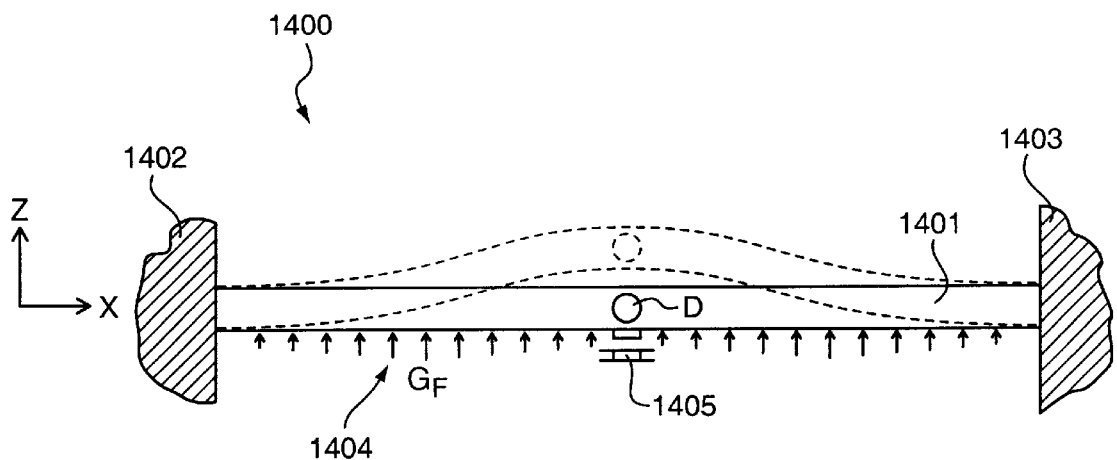
FIG. 14 discloses a vibrating flow tube fixed at both ends with a rotating material flow.

FIG. 14 shows the distribution of gyroscopic force on a flow tube with a helical baffle (not shown) that has both ends fixed. Flow tube 1401 is oriented so that the drive motion is in and out of the plane of the paper (the Y-direction). The drive magnet D is shown at the flow tube center. The flow tube is driven at its first bending resonant frequency. A velocity sensor 1405 is shown below the flow tube center where it can measure the flow tube velocity in the gyroscopic direction. The flow tube with solid lines is shown passing through zero displacement in the gyroscopic direction (Z). The flow tube shown in dashed lines is at the maximum displacement in the gyroscopic (Z) direction. The flow tube 1401 vibration in the drive plane (not visible in this view) results in the left half of the flow tube axis rotating about its left end 1402 while the right half of the flow tube axis rotates about its right end 1403. The tube's longitudinal center does not rotate, but translates. The rotating material flow in conjunction with the flow tube drive plane vibrations causes gyroscopic forces to be applied to the flow tube at ninety degrees to both the drive plane and to the flow tube axis. The distribution of the gyroscopic force $G_F$ (the arrows) is shown along flow tube 1401 as the flow tube passes through the zero deflection point in the gyroscopic direction. The gyroscopic force is at its peak at approximately 25% and 75% along the length of the flow tube. The force goes to zero at the ends of the flow tube and at the center because of the lack of drive mode tube axis rotation at these locations.

Despite the non-uniform force distribution, flow tube 1401 is deflected in its first bending mode (like the drive mode) in the gyroscopic plane. The first banding mode is excited because it is the only mode that has deformation that is all in the same direction (all positive or all negative). Furthermore, the gyroscopic force is applied to the tube by the material at the drive frequency. The drive frequency is also the resonant frequency of the first bending mode in the gyroscopic direction. The gyroscopic response in the first bending mode is large because the tube is driven at or near resonance by the gyroscopic force.

FIG. 15

Figure 15:
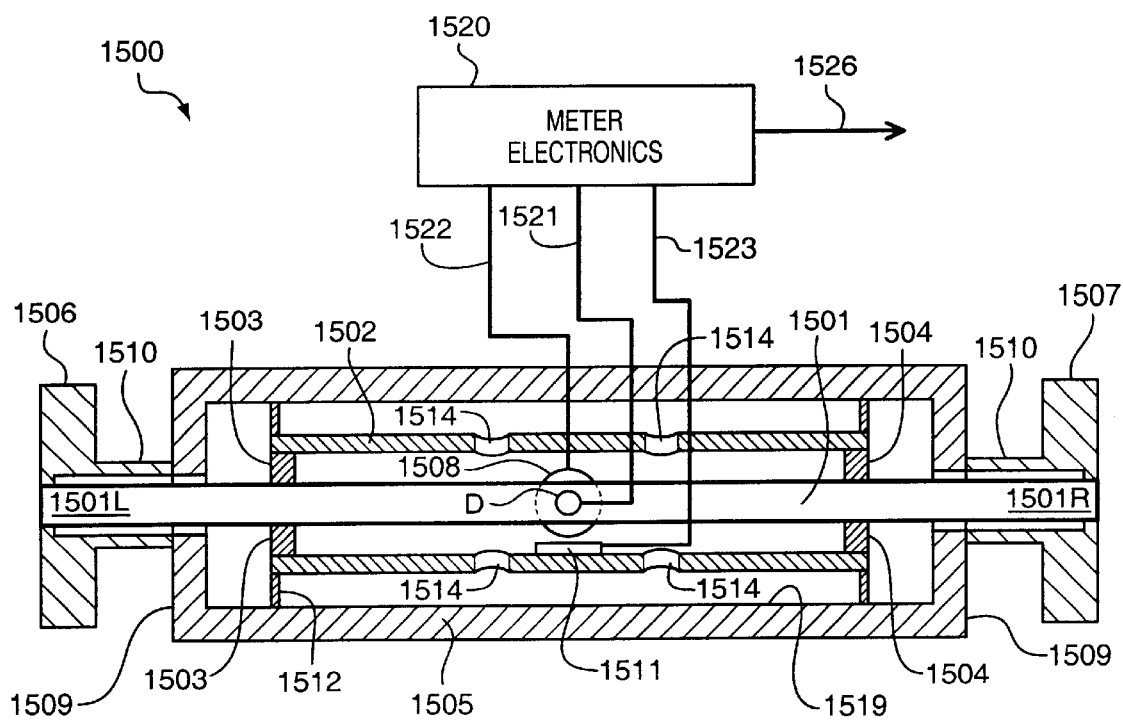
FIG. 15 discloses one possible preferred exemplary embodiment of a cross section of a gyroscopic flowmeter.

FIG. 15 shows one preferred exemplary embodiment of the present invention. It includes a balance bar 1502 which is connected to flow tube 1501 by connecting rings 1503 and 1504 at the ends of balance bar 1502. The balance bar and flow tube of FIG. 15 are driven in phase-opposition by the driver D which drives them at their mutual resonant frequency in the drive plane (perpendicular to the plane of the paper). Balance bar 1502 is designed to counterbalance flow tube 1501 in both the drive and the gyroscopic directions and to thereby fix regions (nodes) at the ends of the active portion of the flow tube where the flow tube is joined to connecting rings 1503 and 1504. The resonant frequency of balance bar 1502 first bending mode is equal to or slightly less than the resonant frequency of the flow tube 1501 first bending mode. Balance bar 1502 can be a tubular member with a resonant frequency lowered by added masses and cutouts 1514. The location and influence of cutouts is discussed later in conjunction with FIG. 18. The balance bar of FIG. 15 can also have four-way symmetry (both directions in the drive and gyroscopic force planes) so that it has equal resonant frequencies in the drive and gyroscopic directions. Having the resonant frequencies equal maximizes the gyroscopic vibration amplitude and thus the flow sensitivity of the meter.

With material flow, the gyroscopic force excites flow tube 1501 to vibrate in the gyroscopic direction (in the plane of the paper) at the same (drive) frequency. The motion of flow tube 1501 in the gyroscopic direction, at ninety degrees to the drive direction, excites the balance bar in the gyroscopic direction via connecting rings 1503, 1504 which fasten the ends of balance bar 1502 to the ends of the active portion of flow tube 1501. The balance bar, because it is being driven at or near its resonant frequency, vibrates out of phase with the flow tube in the gyroscopic direction and increases its amplitude until it counterbalances the gyroscopic motion of the flow tube. Thus flow tube 1501 is vibrated in both the drive plane and the gyroscopic plane and is dynamically counterbalanced in both directions by balance bar 1502.

In contrast, single flow tube Coriolis flowmeters are dynamically counterbalanced only in the drive mode. Most commercial Coriolis flowmeters have no counterbalance for the Coriolis force. The Coriolis force is applied to the flow tube at the drive frequency and in the drive plane, but the Coriolis force has opposite signs on either side of the driver. This Coriolis force distribution attempts to excite the second bending mode of the balance bar and counterbalance the Coriolis force. However, the balance bar second bending mode resonant frequency is nearly three times the drive frequency. Thus, the balance bar is not excited in the second bending mode and the Coriolis forces are not fully balanced.

The enhanced sensitivity balance bar disclosed in U.S. Pat. No. 5,987,999 is an exception since it addresses this issue. The balance bar addressed in U.S. Pat. No. 5,987,999 has the balance bar resonant frequency for the second bending mode lowered so as to be near the drive frequency. For the other commercial flowmeters, because of the frequency separation, the second bending mode of the balance bar is not sufficiently excited and the Coriolis force is not counterbalanced. Lack of counterbalance is a problem for Coriolis meters because it leads to meter shaking and results in meter inaccuracy. The gyroscopic meter does not suffer from this problem because the gyroscopic vibration of the flow tube is counterbalanced by the balance bar.

Coriolis forces are produced in the vibrating flow tube of the gyroscopic meter. They have no impact on the gyroscopic measurement, however, because they and the resultant Coriolis deflection of the flow tube are in the drive plane and are not seen by the centrally located gyroscopic velocity sensor. Furthermore, unbalanced vibration in the drive/Coriolis plane has no impact on the gyroscopic amplitude measurement in the gyroscopic plane.

The meter of FIG. 15 has a drive magnet D and a drive coil (not shown)at the longitudinal center of the flow tube and balance bar. A drive amplitude pickoff (velocity sensor) 1508 is located on the opposite side of the flow tube to the drive magnet. The drive amplitude pickoff has an output that is proportional to the velocity or vibration amplitude of the flow tube 1501 with respect to the balance bar 1502 in the drive direction. It is used to control the drive amplitude of the vibrating flow tube.

A gyroscopic amplitude pickoff (velocity sensor) 1511 is located at flow tube 1501 center and at ninety degrees to driver D. This velocity sensor has an output that is proportional to the velocity or vibration amplitude of the flow tube with respect to the balance bar in the gyroscopic direction. Since the flow tube vibration amplitude in the gyroscopic direction is proportional to both the drive amplitude and to the mass flow rate, the gyroscopic velocity sensor output cannot be used alone as an indicator of mass flow rate. The drive vibration amplitude must also be known. The preferred method does not control the drive vibration amplitude precisely, instead it measures the drive vibration amplitude precisely. The ratio of the amplitude output of the gyroscopic velocity pickoff 1511 divided by the precisely measured amplitude output of the drive pick off 1508 is used to determine the mass flow rate. This method essentially measures the aspect ratio of the elliptical path taken by the flow tube. The aspect ratio of the ellipse is proportional to the mass flow rate and is independent of the ellipse size and the drive amplitude.

The flowmeter 1500 of FIG. 15 comprises a flow tub 1501 a balance bar 1502 having ends connected by connecting rings 1503 and 1504 to flow tube 1501. The inactive flow tube portions 1501 L and 1501 R of flow tube 1501 project axially outward beyond connecting rings 1503 and 1504 and through ends 1509 of case 1505. The tubes terminate in flanges 1506 and 1507. Case connect links 1512 connect the ends of balance bar 1502 with the inner wall 1519 of case 1505.

Meter electronics 1520 controls the operation of flowmeter 1500. In so doing it extends signals over path 1521 to actuate driver D which vibrates flow tube 1501 and balance bar 1502 in phase opposition in a plane perpendicular to the plane of the paper. The amplitude of the drive vibration is measured by drive pickoff 1508 and the drive vibration signal is conveyed to the electronics 1520 along path 1522. With material flow through the vibrating flow tube, gyroscopic forces are created as previously described. These forces vibrate the flow tube and the balance bar in phase opposition in the plane of the paper. These gyroscopic vibrations are detected by pick off 1511 and the signals generated by it are extended over path 1523 to meter electronics 1520. Meter electronics processes the information received over paths 1522 and 1523 and generates output signals over path 1526 containing information pertaining to the material flow. Elements 1510 comprise the neck of flanges 1507 and 1506.

The gyroscopic flowmeter 1500 may have a balance bar and flow tube pair having a resonant frequency in the drive direction different than its resonant frequency in the gyroscopic direction. An embodiment having different resonant frequencies for the drive and gyroscopic directions can have advantages over an embodiment in which the resonant frequencies are equal. For instance, a meter having unequal resonant frequencies can be used to compensate for a change in meter flow sensitivity with the flowing material density.

The change in sensitivity with density is common in Coriolis meters and also exists in gyroscopic flowmeters having equal resonant frequencies in the drive and gyroscopic directions. The change in sensitivity is due to the change with density of the amplitude ratio between the flow tube and the balance bar in the drive mode. The amplitude ratio change helps keep the meter balanced by decreasing the flow tube drive amplitude as material density increases, and increasing the balance bar drive amplitude so as to maintain the same combined vibration amplitude. This amplitude ratio shift maintains meter balance in the drive plane by conserving momentum The heavier tube moves less and the unchanged balance bar moves more with increasing density. The amplitude ratio shift with density is inherent in the geometry of a good flowmeter design. But, the decrease in flow tube amplitude results in lower gyroscopic force being generated for the same flow rate. The lower gyroscopic force means that the tube vibration amplitude in the gyroscopic direction is lower for a high density material than a low density material. The net result is that the gyroscopic flowmeter has lower flow sensitivity for a more dense flowing material than for a less dense one. This effect is discussed in detail in U.S. Pat. No. 5,969,265.

One way to compensate for the change in meter flow sensitivity with density is to design the meter so that the resonant frequency in the drive direction is above the resonant frequency in the gyroscopic direction. The higher density material causes the drive vibration frequency to decrease. If the resonant frequency in the gyroscopic direction is sufficiently below the drive frequency, then the lowering of the drive frequency causes the gyroscopic force to be applied at a frequency that is nearer to the gyroscopic resonant frequency. Since the amplification of a vibration increases as the driving frequency approaches the resonant frequency of the vibrating member, this lowering of the drive frequency causes the amplitude of vibration in the gyroscopic direction to increase and cancel the decrease in amplitude caused by the increase in material density.

The resonant frequencies in the drive and gyroscopic planes are easily separated by making the dynamic structure stiffer or more flexible in the drive direction than in the gyroscopic direction. For instance, the balance bar of FIG. 15 has slots 1514 in the balance bar in a location that has low bending stress in the drive mode of vibration and that has high bending stress in the gyroscopic mode of vibration. Holes in this location lower the gyroscopic resonant frequency while leaving the drive resonant frequency essentially unchanged.

FIG. 16

Figure 16:
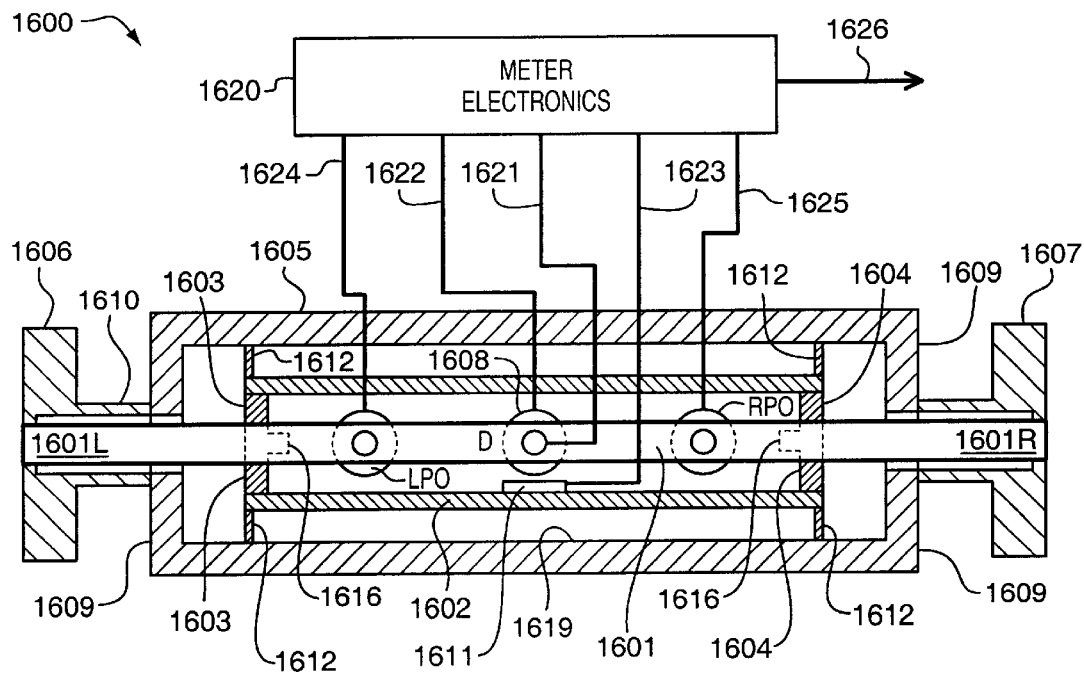
FIG. 16 discloses a possible preferred exemplary embodiment of a cross section of a combined gyroscopic/Coriolis flowmeter.

FIG. 16 discloses flowmeter 1600 that is similar in almost every respect to flowmeter 1500 of FIG. 15. Flowmeter 1600 is designated with reference numbers in the 1600 series in a manner to indicate their correspondence with the corresponding elements of FIG. 15 having numbers in the 1500 series. Flowmeter 1600 responds to the generation of gyroscopic forces in the same manner as does flowmeter 1500 and extends signals over paths 1622 and 1623 representing the gyroscopic and drive vibration amplitudes which, in turn, represent the material flow rate within flowmeter 1600. One difference between the flowmeters of FIG. 15 and FIG. 16 is that the flowmeter of FIG. 15 uses slots in the balance bar to lower the gyroscopic resonant frequency below the drive frequency whereas the flowmeter of FIG. 16 uses extensions 1616 on the connecting rings 1604 to raise the drive frequency. Both methods serve the same function which is to separate resonant frequencies in the drive and gyroscopic directions and thereby render the flowmeter sensitivity independent of material density. The connecting rings 1616 are discussed in detail in FIG. 17.

Another difference between the flowmeters of FIG. 15 and FIG. 16 is that flowmeter 1600 additionally has pickoffs LP0 and RP0 affixed to flow tube 1601. These pick offs respond to the Coriolis forces generated by the vibrations of flow tube 1601 with material flow. The Coriolis forces are detected by pick offs LP0 and RP0 and transmitted over paths 1624 and 1625 to meter electronics 1620 which determines the flow rate using the Coriolis signal input. Thus, meter electronics 1620 determines the flow rate using two separate methods: Coriolis and gyroscopic forces. The two flow rates, calculated from independent sensor inputs and methods, can be used to enhance accuracy through averaging or error checking. For instance, in some operational circumstances such as extreme temperature conditions, the two sets of information may not agree and in such instances, the output information of one set may be used to the exclusivity of the other. In other operational circumstances, the two sets of output information may be combined and averaged to provide material flow information of improved accuracy to path 1626. Furthermore, using two methods of flow measurement can increase the reliability of the flowmeter by providing a backup should one measurement means fail.

FIG. 17

Figure 17:
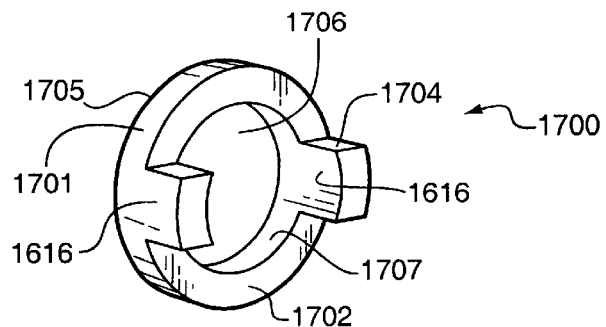
FIG. 17 discloses details of a connecting ring.

FIG. 17 discloses a connecting ring 1700 that may advantageously be used for connecting rings 1503,1504, as well as 1603 and 1604 of flowmeters 1500 and 1600 on FIGS. 15 and 16. Connecting ring 1700 is essentially a circular member having a circular exterior surface 1701 with a center opening 1706 as well as projecting side elements 1616. Connecting ring 1700 is fitted over flow tubes 1501 and 1601 with the flow tubes extending through the circular opening 1706. The inner surface 1707 is affixed by brazing or the like to the exterior surface of the flow tubes. Exterior surface 1701 of connecting ring 1700 is coupled by brazing or the like to the interior wall 1519 and 1619 of balance bars 1502 and 1602. A primary function of connecting rings 1700 is to provide a path to couple the vibrations of the ends of the balance bars to the flow tubes.

Connecting rings 1700 are inserted onto the flow tubes so that the projecting side portions 1616 are on the top and bottom of the flow tubes as shown on FIG. 16. The projecting portions shorten the vibrational length of the flow tube in so far as the drive vibration resonant frequency is concerned while it leaves unaffected the vibrational length and hence the resonant frequency in the gyroscopic direction. This alters the resonant frequency separation of the drive vibrations with respect to the resonant frequency of the gyroscopic vibrations. The frequency separation permits the flowmeters to compensate for changes in flow sensitivity with density. Connecting ring projections are affixed to the top and bottom of the flow tube as shown on FIG. 16 when it is desired to raise the drive frequency with respect to the gyroscopic frequency. Conversely, connecting ring 1700 is rotated so that the projecting side portions 1703 are affixed to the sides of the flow tube as shown on FIG. 15 when it is desired to raise the gyroscopic frequency with respect to the drive frequency.

FIG. 18

Figure 18:
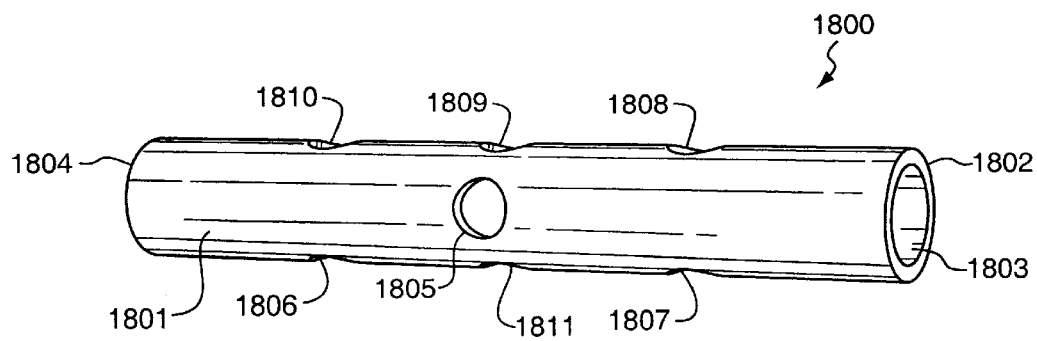
FIG. 18 discloses details of a balance bar.

FIG. 18 discloses a balance bar 1800 having lowered resonant frequencies. At the longitudinal center of the balance bar are holes in both the gyroscopic direction and the drive direction. Only holes 1805, 1809 and 1811 are visible but it is to be understood that there are two unseen holes opposite holes 1805 and 1809. This four-way symmetry lowers the resonant frequencies equally in both the drive and gyroscopic directions.

If we assume that hole 1805 has its axis in the drive direction, then the other two pairs of holes 1810, 1806, and 1808, 1807 are located having their axes in the gyroscopic direction. Their locations put them on the neutral axis in the drive vibration mode. This results in small impact on the drive mode resonant frequency. The two pairs of holes, however, are on the sides of the balance bar having the peak stress in the gyroscopic vibration mode. Their location reduces the resonant frequency in the gyroscopic vibration mode. The lowering of the balance bar frequency in the gyroscopic direction by the use of these holes separates the drive direction resonant frequency from the gyroscopic direction resonant frequency and in so doing enhances the ability of the flowmeter to compensate for changes in flow sensitivity with density.

FIG. 19

Meter electronics 1900 on FIG. 19 discloses further details of an embodiment of meter electronics 1520 on FIG. 15. Embodiment 1900 applies a drive signal over path 1521 to driver D on FIG. 15 to vibrate flow tube 1501 and balance bar 1502 in phase opposition. This drive signal is generated by driver amplitude control element 1901. Embodiment 1900 also receives pickoff signals over paths 1522 and 1523. The signal received on path 1522 is received from the output of driver pickoff 1508 and is applied to element 1902. Element 1902 extends the signal received on path 1522 to driver amplitude control element 1901 over path 1905. This signal enables element 1901 to generate the required signal for driver D on FIG. 15. Element 1902 also extends the driver pickoff output signal on path 1522 over path 1904 to element 1907.

Element 1903 receives the gyroscopic pickoff output of element 1511 over path 1523. This signal represents the amplitude of the gyroscopic mode deflections of flow tube 1501 in the gyroscopic plane. Element 1903 extends this signal over path 1906 to element 1907 which determines the ratio of the gyroscopic pickoff signal on path 1523 to the driver pickoff signal on path 1522. Element 1907 extends the determined ratio over path 1908 to element 1909 which generates the mass flow rate of the flowing material using the expression shown in rectangle 1909 where M is the mass flow rate. The calculated mass flow rate is then extended over path 1526 to a utilization circuit not shown.

FIG. 20

FIG. 20 discloses a second possible exemplary embodiment of meter electronics 1520 on FIG. 15. It has been described how the embodiment 1900 of meter electronics 1520 shown on FIG. 19 calculates the mass flow rate using a determination of the ratio of the gyroscopic vibrational amplitude to the vibrational amplitude of the driver. Embodiment 2000 on FIG. 20 for meter electronics 1520 generates mass flow rate information in a manner that does not require a determination of the drive amplitude as is the case for embodiment 1900. Driver pickoff register 2003 on FIG. 20 receives a signal from the driver pickoff element 1508 over path 1522 and extends the received signal over path 2002 to driver amplitude control 2001 which, in turn, sends a signal of a precisely controlled amplitude over path 1521 to driver D of FIG. 15. Driver amplitude control 2001 differs from its counterpart element 1901 on FIG. 19 in that the signal amplitude of the drive signal generated by element 2001 is controlled with precision. Element 2000 therefore does not require a determination of the amplitude ratio of the gyroscopic mode signal to the drive mode signal to calculate the mass flow rate. Since the amplitude of the driver amplitude control 2001 is controlled with precision, it is known in advance and may be used internally by element 2007 to calculate the mass flow rate using only the signal representing the amplitude of the gyroscopic mode vibration of flow tube 1501. This information is received from gyroscopic pickoff 1511 on FIG. 15, is extended over path 1523 to the gyroscopic pickoff element 2004 and is then further extended over path 2006 to element 2007. Element 2007 receives the gyroscopic mode vibration amplitude and uses it directly in the calculation of the mass flow rate. This mass flow rate information is then extended over path 1526 to a utilization circuit not shown.

FIG. 21

Figure 21:
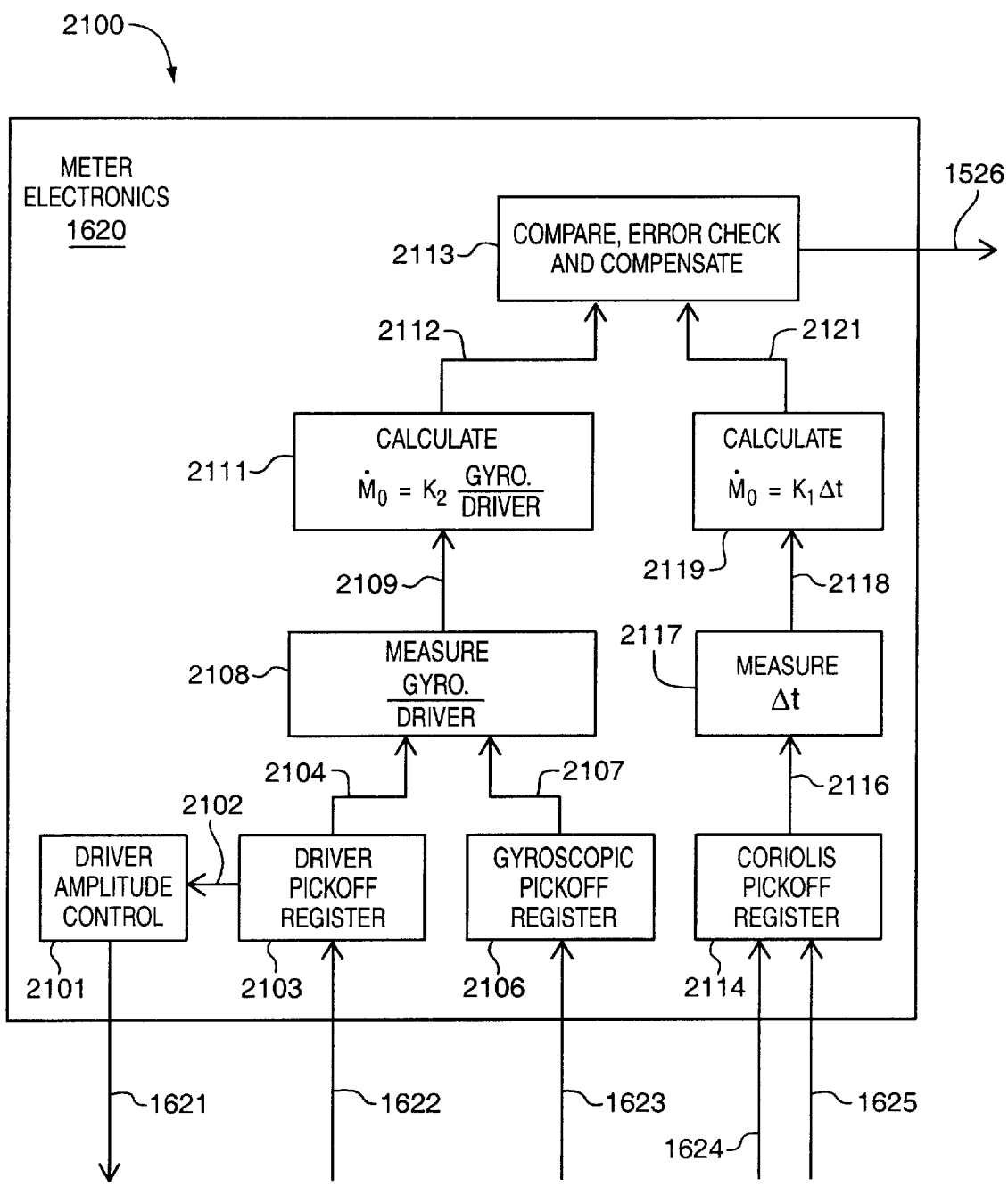

FIG. 21 represents a possible preferred exemplary embodiment 2100 of meter electronics 1620 on FIG. 16. It will be recalled that the flowmeter of FIG. 16 generates material flow information using signals representing the Coriolis deflections of flow tube 1601 as well by using signals representing the deflections of flow tube 1601 in the gyroscopic plane. The Coriolis signals are generated by pickoffs LP0 and RP0 and extended over paths 1624 and 1625 to meter electronics 1620 and in particular to element 2114. The gyroscopic mode material flow information is generated by pickoff 1611 on FIG. 16 and transmitted over path 1623 to element 2106. Embodiment 2100 also generates a drive signal for driver D on FIG. 16. This signal is generated by driver amplitude control 2101 and extended over path 1621 to driver D. Path 1622 receives a signal representing the vibrational amplitude of driver D of FIG. 16. This signal is extended over path 1622 to driver pickoff register 2103 which, in turn, extends the signal over paths 2102 and 2104 to elements 2101 and 2108. The signal on path 2101 controls the amplitude of the drive signal generated by element 2101. The signal on path 2104 applies driver amplitude information to element 2108. A signal representing the amplitude of the gyroscopic mode vibrations of flow tube 1601 are applied to path 1623 by gyroscopic pickoff output element 1611. The signal on path 1623 is extended to element 2106 via path 2107 to element 2108. Element 2108 functions in the manner described for element 1907 of FIG. 19 to determine the amplitude ratio of the gyroscopic mode signal to the drive mode signal. This determined ratio is extended over path 2109 to element 2111 which generates mass flow rate information in the same manner as does element 1909. The gyroscopic mass flow rate information is then extended over path 2112 to element 2113 whose function is subsequently described.

Coriolis mode output signals are received by element 2114 over paths 1624 and 1625. These signals are then extended over path 2116 to element 2117 which measures the time differential At between the Coriolis signals from pickoff LP0 and that from pickoff RP0 of FIG. 16. This time differential information is extended over path 2118 to element 2119 which calculates the mass flow rate using the indicated expression where the magnitude of the time differential At is proportional to the magnitude of the mass flow rate M. The mass flow rate information from element 2119 is extended over path 2121 to element 2113.

Element 2113 receives information from two different sources representing the material mass flow rate. The information received on path 2121 represents the mass flow rate determined by the use of Coriolis mode deflections of flow tube 1601. The signal on path 2112 represents the mass flow rate determined by the use of the amplitude of the gyroscopic mode deflections of flow tube 1601. Element 2113 receives the two sets of mass flow rate data and compares them to determine that their data correspond. Element 2113 also functions in the event of a non-correspondence of this data to perform error checking as well as to correct the data using compensation techniques.

It can be seen that the gyroscopic flowmeter of the present invention is advantageous in that the flow rate is proportional to the ratio between two voltages (outputs of the velocity sensors) that can be made sufficiently large to enable accurate flow measurement with simple electronics. The electronics can be much cheaper and robust than those required for Coriolis flowmeters. Also, the gyroscopic flow meter is easily designed so as to have a flow sensitivity that is independent of material density.

It is to be expressly understood that the claimed invention is not to be limited to the description of the preferred embodiment but encompasses other modifications and alterations within the scope and spirit of the inventive concept. For example, although the present invention has been disclosed as comprising a part of a single straight tube flowmeter, it is to be understood that the present invention is not so limited and may be used with other types of flowmeters including single tube flowmeters of irregular or curved configuration as well as flowmeters having a plurality of flow tubes. The term "axis" as used herein shall be understood as being an imaginary or real straight line about which an object actually or supposedly rotates.

What is claimed is:

1. A flowmeter having a material inlet, a material outlet, and flow tube apparatus connected between said inlet and said outlet, said flowmeter being adapted to receive a material flow at said inlet and to extend said material flow through said flow tube apparatus to said outlet; said flowmeter further comprising:

a driver that cyclically deforms said flow tube apparatus by vibrating said flow tube apparatus at a drive frequency in a drive plane that includes said longitudinal axis of said flow tube apparatus;

said material flow rotates in said flow tube apparatus about said longitudinal axis of said vibrating flow tube apparatus;

said flow tube apparatus is responsive to said cyclic deformation and to said rotation of said material flow to generate a cyclic gyroscopic mode deformation of said flow tube apparatus in a gyroscopic plane; said cyclic gyroscopic mode deformation has an amplitude related to the magnitude of said material flow;

pickoff apparatus responsive to said gyroscopic mode cyclic deformation that generates gyroscopic signals indicative of the magnitude of said material flow; and meter electronics responsive to the generation of said gyroscopic signals that generates output information pertaining to said material flow.

2. The flowmeter of claim 1 characterized in that said gyroscopic plane is perpendicular to said drive plane and to said longitudinal axis of said flow tube.

3. The flowmeter of claim 1 characterized in that said pickoff apparatus includes a first pickoff that generates signals representing the amplitude of said cyclic gyroscopic mode deformation;
   said flowmeter further includes conductor apparatus that extends said signals from said pickoff apparatus to said meter electronics;
   said meter electronics is responsive to the receipt of said signals generated by said first pickoff that generates said information pertaining to said material flow.

4. The flowmeter of claim 3 characterized in that said pickoff apparatus further includes:
   a second pickoff that generates a signal representing the amplitude of said cyclic flow tube deformation in said drive plane; and
   characterized in that said meter electronics includes:
      apparatus responsive to the receipt of said signals generated by said first and second pickoffs that determines the ratio of the amplitude of said cyclic flow tube gyroscopic mode deformation in said gyroscopic plane to the amplitude of said cyclic flow tube deformation in said drive plane; and
      apparatus responsive to said determination of said ratio that generates said output information pertaining to said material flow.

5. The flowmeter of claim 4 characterized in that said output information includes the mass flow rate of said material flow.

6. The flowmeter of claim 1 characterized in that said flowmeter further includes a pickoff that measures the amplitude of said cyclic gyroscopic mode deformation of said flow tube in said gyroscopic plane; said meter electronics comprises:
   apparatus that controls the amplitude of said cyclic flow tube deformation in said drive plane; and
   apparatus responsive to said measurement of the amplitude of said cyclic gyroscopic mode deformation of said flow tube in said gyroscopic plane that determines the mass flow rate of said material flow.

7. The flowmeter of claim 1 characterized in that said drive frequency is equal to the resonant frequency of said cyclic gyroscopic mode deformation amplitude to maximize said cyclic gyroscopic mode deformation in said gyroscopic plane.

8. The flowmeter of claim 1 characterized in that said drive frequency is not equal to the resonant frequency of the gyroscopic mode deformation to alter the relationship between the material flow density and the amplitude of said cyclic gyroscopic mode deformation in said gyroscopic plane.

9. The flowmeter of claim 1 characterized in that said flow tube apparatus comprises:
   a single straight flow tube:
   a helix internal to said flow tube, said helix imparts said rotation to said material flow about said longitudinal axis of said flow tube to generate said cyclic gyroscopic mode deformation in said gyroscopic plane.

10. The flowmeter of claim 1 characterized in that said flow tube apparatus comprises:
    a single flow tube having a helix shape that imparts said rotation to said material flow about said longitudinal axis of said flow tube.

11. The flowmeter of claim 1 characterized in that said flow tube apparatus comprises:
    a plurality of flow tubes twisted together about a common longitudinal axis to have an elongated shape that imparts said rotation to said material flow about said common longitudinal axis.

12. The flowmeter of claim 1 characterized in that said flow tube apparatus comprises:
    a bar and a flow tube wound on said bar to form a coil that imparts said rotation to said material flow about the common longitudinal axis of said flow tube and said bar.

13. The flowmeter of claim 12 characterized in that said elongated bar is substantially straight.

14. The flowmeter of claim 12 characterized in that said bar and said flow tube are twisted together about said common longitudinal axis.

15. The flowmeter of claim 1 wherein said material flow generates Coriolis forces in said drive plane on said vibrating flow tube apparatus, said Coriolis forces produce Coriolis deflections of said flow tube apparatus in said drive plane;
    characterized in that said flowmeter further comprises:
       pickoff apparatus on said flow tube apparatus that detect said Coriolis deflections and generate Coriolis signals containing information pertaining to said material flow;
       said meter electronics is responsive to the generation of said Coriolis signals and said gyroscopic signals that generates output information pertaining to said material flow.

16. The flowmeter of claim 1 further comprising:
    a balance bar parallel to said flow tube apparatus;
    connecting ring apparatus connecting ends of said balance bar to said flow tube apparatus;
    said driver cyclically deforms said flow tube apparatus and said balance bar in phase opposition in said drive plane at the resonant frequency of said material filled flow tube apparatus and said balance bar;
    said cyclic gyroscopic mode deformation vibrates said material filled flow tube apparatus and said balance bar in said gyroscopic plane at the resonant frequency of the cyclic gyroscopic mode deformation.

17. The flowmeter of claim 16, further comprising:
    a case enclosing said balance bar and said flow tube apparatus;
    case ends connected to ends of said case;
    ends of said flow tube apparatus project through said case ends of said case and are connected to flanges;
    a first one of said flanges receives said material flow from a material source and extends said material flow through said flowmeter;
    a second one of said flanges on an output end of said flow tube apparatus receives said material flow from said flow tube apparatus and extends said material flow to a destination.

18. The flowmeter of claim 16 characterized in that said connecting ring apparatus comprises:
    first and second connecting rings connecting each end of said balance bar to said flow tube apparatus; and
    lateral axial projections on said connecting rings in said drive plane and affixed to lateral side walls of said flow tube apparatus that alters the resonant frequency separation of said flow tube apparatus and said balance bar deformation in said drive plane and said cyclic gyroscopic mode deformation of said flow tube apparatus and said balance bar in said gyroscopic plane.

19. The balance bar of claim 16 further including openings in the walls of said balance bar that alter the separation of the resonant frequencies of said cyclic deformation in said drive plane and said cyclic gyroscopic mode deformation of said flow tube apparatus and said balance bar in said gyroscopic plane.

20. A method of operating the apparatus of claim 1; said method comprises the steps of:
cyclically deforming said flow tube apparatus by vibrating said flow tube apparatus in said drive plane;
imparting said rotation to said material flow about said longitudinal axis of said flow tube apparatus in response to said material flow, said rotation causes said cyclic gyroscopic mode deformation of said flow tube apparatus in said gyroscopic plane;
generating signals indicative of the magnitude of said material flow in response to said generation of said cyclic gyroscopic mode deformation; and
operating said meter electronics in response to said generation of said signals that generates output information pertaining to said material flow.

21. The method of claim 20 characterized in that said step of said generating output signals includes the step of generating signals representing the amplitude of said cyclic gyroscopic mode deformation in said gyroscopic plane.

22. The method of claim 20 further including the steps of:
determining the amplitude of said flow tube apparatus cyclic deformation in said drive plane;
determining the ratio of the amplitude of said flow tube apparatus cyclic gyroscopic mode deformation in said gyroscopic plane to the amplitude of said flow tube apparatus cyclic deformation in said drive plane; and
in response to said determination of said ratio, generating said output information pertaining to said material flow.

23. The method of claim 20 further including:
controlling the amplitude of said flow tube apparatus cyclic deformation in said drive plane;
measuring the amplitude of said cyclic gyroscopic mode deformation of said flow tube apparatus in said gyroscopic plane; and
operating said meter electronics in response to said measurement that generates said output information pertaining to said material flow.

24. The method of claim 20 including operating said flowmeter so that said resonant frequency of said cyclic flow tube apparatus deformation in said drive plane is equal to the gyroscopic mode deformation resonant frequency to maximize the amplitude of said cyclic gyroscopic mode deformation in said gyroscopic plane.

25. The method of claim 20 including operating said flowmeter so that said resonant frequency of said cyclic flow tube apparatus deformation in said drive plane is not equal to the gyroscopic mode deformation resonant frequency to alter the relationship between the density of said material flow and the amplitude of said cyclic gyroscopic mode deformation in said gyroscopic plane.

26. The method of claim 20 wherein said flow tube apparatus comprises a single straight flow tube:
said method includes the step of inserting a helix internal to said flow tube to impart said rotation to said material flow about the longitudinal axis of said flow tube.

27. The method of claim 20 wherein said flow tube apparatus comprises a single flow tube and wherein said method further includes the step of operating said flowmeter with said flow tube formed to define a coil spring shape that imparts said rotation to said material flow about the longitudinal axis of said flow tube.

28. The method of claim 20 wherein said flow tube apparatus comprises a plurality of flow tubes and wherein said method further includes the steps of;
twisting said plurality of flow tubes together about a common longitudinal axis to define an elongated shape that imparts said rotation to said material flow.

29. The method of claim 20 wherein said flow tube apparatus comprises a single flow tube and wherein said method further includes the step of winding said flow tube on an elongated bar to form a coil that imparts said rotation to said material flow about a longitudinal axis common to said flow tube and said bar.

30. The method of claim 20 wherein said material flow go generates Coriolis forces in said drive plane on said vibrating flow tube apparatus, said Coriolis forces produce periodic Coriolis deflections of said flow tube apparatus in said drive plane; characterized in that said method further comprises;
operating pickoffs on said flow tube apparatus that detect said Coriolis deflections and generate output signals pertaining to said material flow; operating said meter electronics in response to the generation of said Coriolis signals and said gyroscopic signals that generates output information pertaining to said material flow.

31. The method of claim 20 further wherein said flowmeter comprises a balance bar parallel to said flow tube apparatus;
connecting ring apparatus connecting ends of said balance bar to said flow tube apparatus;
said method further includes:
operating said driver to vibrate said flow tube apparatus and said balance bar in phase opposition in said drive plane at the resonant frequency of said material filled flow tube apparatus and said balance bar;
operating said flowmeter so that said gyroscopic forces vibrate said material filled flow tube apparatus and said balance bar in said gyroscopic plane at the resonant frequency of said material filled flow tube apparatus and said balance bar in said gyroscopic mode of vibration.

* * * * *

UNITED STATES PATENT AND TRADEMARK OFFICE
CERTIFICATE OF CORRECTION

PATENT NO. : 6,520,028 B1
DATED : February 18, 2003
INVENTOR(S) : Van Cleve, Craig Brainerd and Loving, Roger Scott It is certified that error appears in the above-identified patent and that said Letters Patent is hereby corrected as shown below:

Title page,
Item [57], ABSTRACT,
Line 19, replace "Information for comparison and error checking and other purposes" with -- information for comparison and error checking and other purposes --

Column 2,
Line 47, replace "The present invention overcomes the problems of prior" with -- The present invention overcomes the problems of prior art --

Column 3,
Line 19, replace "of the gyroscope axle is free to move in all direction while" with -- of the gyroscope axle is free to move in all directions while --
Line 25, replace "axle bottom point. But, the rotation of the flywheel gives-the" with -- axle bottom point. But, the rotation of the flywheel gives the --
Line 61, replace "midpoint while the other flowmeter-gyroscope from the tube" with -- midpoint while the other flowmeter-gyroscope extends from the tube --

Column 4,
Line 55, replace "gyroscopic force is lo the drive plane whereas the Coriolis" with -- gyroscopic force is perpendicular to the drive plane whereas the Coriolis --
Line 57, replace "in the same direction for the full length of the flow tune (this" with -- in the same direction for the full length of the flow tube (this --
Line 59, replace "sign in the center of thee flow tube. The uniformity of the" with -- sign in the center of the flow tube. The uniformity of the --

Column 5,
Line 37, replace "flow in both flow tubes about the common axis. The twisted." with -- flow in both flow tubes about the common axis. The twisted --
Line 42, replace "of the flow tube. The flow tube is the vibrated with a driver" with -- of the flow tube. The flow tube is then vibrated with a driver --
Line 61, replace "quency in a drive plane that includes. said longitudinal" with -- quency in a drive plane that includes said longitudinal --

UNITED STATES PATENT AND TRADEMARK OFFICE
CERTIFICATE OF CORRECTION

PATENT NO. : 6,520,028 B1
DATED : February 18, 2003
INVENTOR(S) : Van Cleve, Craig Brainerd and Loving, Roger Scott It is certified that error appears in the above-identified patent and that said Letters Patent is hereby corrected as shown below:

Column 7,
Line 9, replace "common longitudinal axis of said flow tube and said" with
-- common longitudinal axis of said flow tube and said bar --

Column 8,
Line 67, replace "flow tube and wherein. said method further includes the step" with
-- flow tube and wherein said method further includes the step --

Column 9,
Line 1, replace "of winding said flow tube on an elongated bars to form a coil"
with -- of winding said flow tube on an elongated bar to form a coil --

Delete the paragraphs beginning at Column 9, line 34, through Column 12, line 49.

Column 15,
Line 18, replace "90?. Flow tube 901 contains a helical baffle 905 (similar to" with
-- 902. Flow tube 901 contains a helical baffle 905 (similar to --

Column 17,
Line 14, insert the following text -- FIGS. 12-13 --
Line 45, insert the following text -- FIG. 14 --

Column 19,
Line 51, replace "The flowmeter 1500 of FIG. 15 comprises a flow tub 1501" with
-- The flowmeter 1500 of FIG. 15 comprises a flow tube 1501 --

Column 24,
Line 2, replace "the time differential At between the Coriolis signals from" with
-- the time differential Δt between the Coriolis signals from --
Line 7, replace "ferential At is proportional to the magnitude of the mass flow" with
-- ferential Δt is proportional to the magnitude of the mass flow --
Line 58, replace "generate a cyclic gyroscopic mode deformation of said" with
-- generate cyclic gyroscopic mode deformation of said --

UNITED STATES PATENT AND TRADEMARK OFFICE
CERTIFICATE OF CORRECTION

PATENT NO. : 6,520,028 B1
DATED : February 18, 2003
INVENTOR(S) : Van Cleve, Craig Brainerd and Loving, Roger Scott It is certified that error appears in the above-identified patent and that said Letters Patent is hereby corrected as shown below:

<u>Column 28,</u>
Line 6, replace "The method of claim 20 wherein said material flow go" with
-- The method of claim 20 wherein said material flow --

Signed and Sealed this

Twenty-ninth Day of July, 2003

JAMES E. ROGAN
*Director of the United States Patent and Trademark Office*